US006832285B2

(12) United States Patent
Yada et al.

(10) Patent No.: US 6,832,285 B2
(45) Date of Patent: Dec. 14, 2004

(54) MICROCOMPUTER WITH MODE-CONTROLLED MEMORY

(75) Inventors: Naoki Yada, Sayama (JP); Eiichi Ishikawa, Higashimurayama (JP)

(73) Assignees: Renesas Technology Corp., Tokyo (JP); Hitachi Hokkai Semiconductor, Ltd., Hokkaido (JP)

( * ) Notice: Subject to any disclaimer, the term of this patent is extended or adjusted under 35 U.S.C. 154(b) by 113 days.

(21) Appl. No.: 10/080,665

(22) Filed: Feb. 25, 2002

(65) Prior Publication Data

US 2002/0144052 A1 Oct. 3, 2002

(30) Foreign Application Priority Data

Mar. 30, 2001 (JP) ........................................ 2001-097807

(51) Int. Cl.[7] ............................................. G06F 12/00
(52) U.S. Cl. .............................. 711/103; 713/2; 710/14
(58) Field of Search ................................. 711/103, 158; 710/14; 365/226; 712/1; 713/1, 2

(56) References Cited

U.S. PATENT DOCUMENTS

| 5,210,854 A | * | 5/1993 | Beaverton et al. ........... 717/174 |
| 5,444,664 A | * | 8/1995 | Kuroda et al. ............... 365/226 |
| 5,495,593 A | * | 2/1996 | Elmer et al. ................. 711/103 |
| 5,854,937 A | * | 12/1998 | Woodward ..................... 712/1 |
| 5,901,330 A | * | 5/1999 | Sun et al. ....................... 710/8 |
| 5,950,222 A |   | 9/1999 | Yamada et al. .............. 711/103 |
| 6,009,495 A |   | 12/1999 | DeRoo et al. ............... 711/103 |
| 6,009,496 A | * | 12/1999 | Tsai ............................ 711/103 |
| 6,154,837 A |   | 11/2000 | Fudeyasu et al. ............... 713/2 |

OTHER PUBLICATIONS

Ross Mitchell, "128–Kbyte Addressing with the M68HC11", 1990, Motorola, AN432.*
Orgler Electronic, "Applications with microcontroller 68HC11", Sep. 2000, http://www.orglerectronic.com/swflash.htm, 22 Pages.*

* cited by examiner

*Primary Examiner*—Kevin Verbrugge
*Assistant Examiner*—Thang Ho
(74) *Attorney, Agent, or Firm*—Miles & Stockbridge P.C.

(57) ABSTRACT

A microcomputer capable of on-board programming of dedicated user communication protocols without requiring a serial interface on the mounted board, and that will not destroy the dedicated user communication protocol code even if the system runs out of control. A user boot mat other than a user mat is provided for programming control programs for the user in the on-chip non-volatile memory of the microcomputer. The user boot mat serves as the mat for programming the dedicated user communication protocol and also provides a user boot mode for running the program. The user boot mat cannot program or erase in this user boot mode. By separating the user boot mat and user mat, an interface capable of programming and erasing the user-specified programming can be achieved without having to program a dedicated communication protocol on the user mat.

39 Claims, 25 Drawing Sheets

FIG. 4(A)

| OPERATION MODE<br>MAT | BOOT MODE | | | WRITER MODE | | |
|---|---|---|---|---|---|---|
| | ACCESS | PROGRAM | ERASE | ACCESS | PROGRAM | ERASE |
| USER MAT (Mmat) | ○ | ○ | ○ | ○ | ○ | ○ |
| USER BOOT MAT (Umat) | ○ | ○ | ○ | ○ | ○ | ○ |
| BOOT MAT (Tmat) | △ | × | × | △ | × | × |
| REPAIR & TRIMMING (Rmat) | × | × | × | × | × | × |

FIG. 4(B)

| OPERATION MODE<br>MAT | USER BOOT MODE | | | USER MODE | | |
|---|---|---|---|---|---|---|
| | ACCESS | PROGRAM | ERASE | ACCESS | PROGRAM | ERASE |
| USER MAT (Mmat) | ○ | ○ | ○ | ○ | ○ | ○ |
| USER BOOT MAT (Umat) | ○ | × | × | ○ | × | × |
| BOOT MAT (Tmat) | △ | × | × | △ | × | × |
| REPAIR & TRIMMING (Rmat) | × | × | × | × | × | × |

MICROCOMPUTER WITH MODE-CONTROLLED MEMORY

BACKGROUND OF THE INVENTION

The present invention relates to a microcomputer having a CPU (central processing unit) and a nonvolatile memory capable of being electrically written and erased, and relates in particular to a technology effective on one-chip microcomputers having flash memories for permitting or prohibiting programming and erasure on nonvolatile memories.

Electrically erasable and programmable nonvolatile memories such as flash memories, store information according to differences in threshold voltages programmed into the memory cells. This differential in threshold voltages in the flash memory is implemented by differences in the amount of electrons and positive holes stored by the floating gates. For example, applying a voltage at a high level relative to a threshold voltage in a stable thermal state is called the program status; and applying a voltage at a low level relative to the threshold voltage is called the erase status (The reverse of this definition may also be true.) There are no particular restrictions at this time but the erase operation to set the memory cell to erase status and the programming operation to set the memory cell to program status involve repeatedly applying a high voltage pulse and verifying the resulting threshold voltage. The writer mode and the boot mode are operating modes to allow programming and erasing the on-chip flash memory of the microcomputer. The writer mode is an operating mode treating the microcomputer as equivalent to a flash memory chip to program and erase the memory by connecting to a programming device such as an EEPROM writer. The boot mode is an operating mode for example, to establish communications to allow programming or erase with the microcomputer installed the system, by way of synchronized start-stop or a nonsynchronized serial interface (UART). The writer mode can be utilized to program data or program in an initialized state on the on-chip memory, prior to installation in the system. The boot mode on the other hand, can be utilized to reprogram information stored in the on-chip flash memory for program version upgrades or tuning data, prior to installation in the system.

The boot mode of the related art utilizes a serial interface as the basic interfacing method so a serial interface circuit such as for start-stop synchronizing, was incorporated into the system board of the microcomputer, when doing on-board programming by using the boot mode.

SUMMARY OF THE INVENTION

However, some systems essentially do not use start-stop synchronization. In disk drive systems such as CD-ROM (Compact Disk Read Only Memory), CD-RW (Compact Disk Rewritable), DVD-ROM (Digital Video Disk Read Only Memory), DVD-RAM (Digital Video Disk Random Access Memory) an interface such as an ATAPI (AT Attachment Packet Interface) or SCSI (Small Computer System Interface) is required. An area network interface called HCAN is used in automobile control systems such as for engines and transmissions. Even if the user's system board had interfaces such as ATAPI, SCSI or HCAN, if a serial interface for start-stop synchronizing was also required for on-board programming in boot mode, this created the problem of overhead costs in the user's system board.

This problem could be avoided by on-board programming in a memory storage area (in other words, user memory area) on an area of the flash memory where programming is freely allowed, in a user program mode capable of running programs. In other words, programming in advance, in writer mode, a dedicated user board communications protocol program such as for ATAPI in the user memory area. After programming this program, the microcomputer is mounted in the user's system board, and if that dedicated user board communications protocol program is then run by the CPU, the user memory area can be programmed with program version upgrades and data tuning performed.

However, when the dedicated user board communications protocol program was also written on the user area along with the user control program and tuning data, the user had to make it difficult to accidentally erase this dedicated user board communications protocol program, placing the large burden on the user of having to write a program. Further, when the CPU ran out of control in user program mode after installing the microcomputer in the system, and the processing program for running the communications protocol in user program mode was accidentally erased, there was no longer any chance of establishing an interface with the user system board for programming and erasing. Unless the microcomputer chip was removed, and the writer mode used, this method had the problem as clearly stated by the inventor himself, that programming could not be performed. In the specifications of the present invention, the term user broadly signifies the user of the semiconductor device such as the microcomputer. Therefore, if the manufacturer of the semiconductor device utilizes that semiconductor device in some manner, then that manufacturer is by definition a user.

The present invention therefore has the object of providing a microcomputer not prone to lose program information from the nonvolatile memory such as having communication protocols with the mounted board in the event the system is subjected to fatal errors such as deletion.

Another object of the present invention is to provide a microcomputer capable of ensuring an interface can be established with the microcomputer board separately supporting the communication protocol.

Yet, another object is to provide a microcomputer capable of preventing loss of stored information from the on-chip nonvolatile memory even if the CPU is running out of control.

The above described and other objects and unique features will become clear from the description of the present invention with reference to the accompanying drawings.

[1] An overview of a typical aspect of the invention as disclosed in these specifications is disclosed briefly as follows.

Besides a third area (user mat) for programming items such as a user (microcomputer user) control program, a second area (user boot mat) is provided in the on-chip nonvolatile memory of the microcomputer. This user boot mat is used as a memory storage area for programming for example, dedicated user communication protocols, and this mode also provides a user boot mode as a dedicated mode for running the program. This user boot mode is not capable of programming and erasing the user boot mat.

The effects rendered are as follows. (1) The microcomputer can make use of its own optional interface since a user boot mat capable of storing a dedicated user communication protocol is provided. (2) A serial interface need not always be provided on the user mounted board since an interface selected by the user can utilized to program and erase the nonvolatile memory. (3) A user optional program interface for programming and erasing can be implemented by separating the user boot mat and the user mat so that a control program for storage and use in the user mat can easily be made, even without programming a dedicated communication protocol program in the user mat. In other words, special measures for preventing erasure of the communications control program used in the user program mode are not needed. (4) The user boot mode started up from the user boot mat, is unable to program on or erase the user boot mat, so that information stored in the boot mat is not destroyed even when the system is running out of control, and even if the CPU runs out of control during debugging, damage will not extend to the program controlling the external interface so that the user mat can be freely programmed on-board the chip, without having to remove the microcomputer chip.

[2] A microcomputer of a detailed first aspect of the present invention includes a CPU, a nonvolatile memory having an electrically erasable and writable first area (boot mat), a second area (user boot mat) and a third area (user mat), and an operating mode specifier means. The operating mode specifier means specifies a first mode (boot mode) for processing the program on the first area in the CPU and disabling programming and erasing on the first area; a second mode (user boot mode) for processing the program on the second area in the CPU and disabling programming and erasing on the first area and second area; and a third mode (user mode) for processing the program on the third area of the CPU and disabling programming and erasing on the first area and second area; and implements the above for example by the mode signal input circuits.

A microcomputer in this state signifies a condition where a specific program is not stored in the second area and third area, in other words, a state prior to the user storing the desired program in the second and third areas.

When the microcomputer is mounted in the system board, a communication protocol program for establishing the characteristic interface in the system board is stored in the second area, and tuning data and a user program for controlling the system board are stored in the third area, and utilized for controlling the user system. To perform on-board programming, a second mode such as user boot mode is specified, the communications protocol program of the second area is processed in the CPU, the characteristic interface established on the system board, the user program version of the third area is upgraded, or the tuning data is programmed. Therefore, the above effects in (1) through (4) are rendered.

[3] A microcomputer of a detailed second aspect of the present invention includes a CPU, a nonvolatile memory having an electrically erasable and writable first area (boot mat), a second area (user boot mat) and a third area (user mat), and an operating mode specifier means for selectively specifying the first mode, second mode or third mode. The CPU processes the program of the first area by specifying the first mode, processes the program of the second area by specifying the second mode, and processes the program of the third area by specifying the third mode. In the nonvolatile memory, specifying the first mode enables programming and erasing on the second area and third area, and disables programming and erasing on the first area; specifying the second mode enables programming and erasing on the third area and disables programming and erasing on the first area and second area; specifying the third mode enables programming and erasing on the third area and disables programming and erasing on the first and second area. This microcomputer therefore renders the above effects of (1) through (4).

The first area may contain a first communications control program to establish an external interface with the microcomputer. Since programming and erasing are disabled in operating modes for both the first area and second area, initial values can be written using a programming device such as an EPROM writer in the semiconductor manufacturing process. The first communication control program may be a serial interface program functioning by basic start-stop synchronization.

The second area may contain a first communications control program to establish an external interface with the microcomputer. Since programming and erasing in the second area are enabled in the first mode, the second communication control program may be a dedicated user communications protocol, or in other words, may be a communication control program that satisfies the characteristic interface specifications (for example, ATAPI) of the system board.

Since programming and erasing in the first area are disabled in all of the first through third operating modes, placing an erase and programming program in the first area of the nonvolatile memory will prevent unforeseen loss.

A transfer (control) program for the erase and programming program may be installed in the same way, in the second area.

The RAM, on which the CPU may perform transfer processing to transfer the erase and programming program, may be built in the microcomputer. The CPU can run the erase and programming program on the built-in RAM.

In view of the need to prevent programming of the nonvolatile memory that occurs when the CPU runs out of control, a command specifying programming operation may be applied to the nonvolatile memory from an external terminal (separate from the mode specifier means), as a necessary condition for enabling erase and programming operation.

[4] In the microcomputer of the second aspect of the invention, examination of the CPU reset vector address (vector address checked after canceling reset) shows that the lead (beginning) addresses of the first area, second area and third area are set as companion addresses in the address space in the CPU, and a first register means (FMATS) for exclusively specifying the second area or the third area as the lead address utilized by the CPU, is installed in the CPU address space.

In this configuration, when the program of the first area is executed by specifying the first mode, erasing and programming cannot be performed on the first area unless the program of the first area itself includes a routine for programming and erasing on the first area. If assumed that the microcomputer manufacturer will develop and write the program for storage in the first area, then the disabling of programming and erasing operation on the first area is virtually assured. After running the program for the first area specified by the first mode, a shift to the second area or third area program can be made according to the setting on the first register means. After this, returning the first area program to a state where it can again be executed is basically impossible just by using the programs stored in the second area or the third area. Even if the hardware allows returning to that state, erasing and programming on the first area is impossible.

When a RAM is installed in the CPU address space, the CPU can load and run programs from the RAM.

If changing the settings on the first register means is allowed, as a condition for the CPU to process programs on the RAM, a smooth transition can be made from fetching of a program from any of the first through third areas to executing the program in a separate area. Making changes to the first register setting may be allowed under the condition that the bus control means (BSC) detects the processing of the program on the RAM by the CPU.

Installing a second register means (FKEY) set with information allowing an operation to store the erase and programming program in the RAM, and resetting this second register means information by the nonvolatile memory can be made a required condition for allowing erasing and programming. Therefore, even assuming the CPU runs out of control at a time that transferring the erase and programming program to the RAM is not required, the probability is reduced that the erase and programming program will be mistakenly transferred to the RAM and executed due to resetting of the second register means. Further, even assuming the CPU runs out of control when transferring the erase and programming program to the RAM, the second register means is set to a status inhibiting erasing and programming so that the probability of the erase and programming program being mistakenly executed at this time can be lowered.

[5] In the erase and programming program for the microcomputer of the second aspect of the invention, a RAM is installed in the address space of the CPU and the erase and programming program is stored in the first area, and the CPU transfers the erase and programming program to the RAM in response to the first mode, and fetches the erase and programming program from the transfer destination RAM. There is no need for the microcomputer user to develop an erase and programming program. If the erase and programming program on the RAM is executed, then the erase and programming on the second and third areas in first mode will proceed smoothly.

To also utilize the erase and programming program of the first area, in the second mode, the CPU may for example, in second mode, switch to processing the first area program in response to a first setting value of the third register means (SCO), and transfer the erase and programming program to the RAM, and restore status to processing the program of the second area.

To also utilize the erase and programming program of the first area, in the third mode, the CPU may for example, in third mode, switch to processing the first area program in response to a first setting value of the third register means (SCO), and transfer the erase and programming program to the RAM, and restore status to processing the program of the third area.

Installing a second register means (FKEY) set with a second setting value allowing operation to store the erase and programming program in the RAM, and resetting the third setting value with this information can be made a necessary condition for erasing and programming. A state where a second setting value is set in the second register means may be made a necessary condition for allowing setting of the first setting value in the third register means. In other words, the probability of destroying the user program increases, when the program runs out of control and the erase and programming program is transferred at a point when the user does not any erasing or programming. Therefore, to avoid this problem, the user stores a second setting value in the second register means, prior to setting the first setting value in the third register means. The first setting value cannot be set in the third register means when the second setting value has not been stored. When the second setting value has been stored in the second register means, the first setting value can be set in the third register means and in this way allow transferring the program.

The second register is used in view of the case where the program runs out of control after the erase and programming program has been transferred. Basically, due to other conditions, erasing and programming will not be performed even if the CPU runs out of control. However, to increase the reliability even further, the user sets the third setting value in the second register means, prior to erasing or programming. When this third setting has not been stored, erasing and programming is still impossible even if other conditions for erase and programming have been enabled by accident.

[6] The memory storage area available to the user in the non-volatile memory is as follows. The microcomputer includes a CPU, and a nonvolatile memory capable of being electrically erased and programmed, and the nonvolatile memory includes a first memory mat (user boot mat) and a second memory mat (user mat); and the first memory mat and second memory mat are capable of being exclusively selected in the register, and when the first memory mat is selected, erasing and programming is disabled on the first memory mat; and when the second memory mat is selected, erasing and programming is disabled under the condition that shifting of the program to execute status on the RAM is canceled. Unexpected problems occurring due to erasing or programming on the memory mat whose program is currently being run are therefore prevented.

[7] The overall memory storage area of the nonvolatile memory is as follows. The microcomputer includes a CPU, and a nonvolatile memory capable of being electrically erased and programmed, the nonvolatile memory includes a first area (boot mat) having a communications control program (serial communications control program PGM) for establishing an external interface with the nonvolatile memory; and a second area (user boot mat) capable of being erased and programmed via an external interface established by a communications control program processing by the CPU; and a third area (user mat) capable of being erased and programmed via an external interface established by a communications control program processing by the CPU and also of being erased and programmed by the CPU with the second area program.

[8] In another aspect of a microcomputer for mounting with a board having a first interface (ATAPI, SCSI, HCAN), the microcomputer has a central processing unit, and a nonvolatile memory having a first memory storage area (boot mat) for storing a first communications program for establishing a communications protocol (UART) utilizing a second interface (SCI) different from the first interface; a second memory storage area (user boot mat) for storing a second communication program for establishing a communications protocol using the first interface; and a third memory storage area (user mat) stored with a control program executed by the central processing unit in the specified first operating mode.

The first memory storage area further stores a communications program, and the second communications program stored at this time in the second memory storage area, is written in the second memory storage area in the first programming mode executed by the central processing unit running the programming program and the first communications program.

The control program stored in the third memory storage area is written into the third memory storage area by either a first programming mode, or a second programming mode executed by the central processing unit running the programming program and the second communications program stored in the first memory storage area.

The first memory storage area further stores an erase program, and the second communications program stored at this time in the second memory storage area, can be erased from the second memory storage area in the first erase mode executed by the central processing unit running the programming program and the first erase program.

The control program stored in the third memory storage area can be erased from the third memory storage area in either a first erase mode, or a second erase mode executed by the central processing unit running the second communications program and the erase program stored in the first memory storage area.

A microcomputer of yet another aspect of the invention is comprised of a central processing unit, and nonvolatile memory having a first memory storage area for storing a communications program and a first communications program for establishing a communications protocol (UART) utilizing a first interface (SCSI); a second memory storage area for storing a second communications program to establish a communications protocol utilizing a second interface (ATAPI, SCSI, HCAN) different from the first interface, and a third memory storage area storing a control program executed by the central processing unit in a specified first operating mode.

BRIEF DESCRIPTION OF THE DRAWINGS

FIGS. 4A and 4B show examples of access status in each mode of the memory mat of the flash memory.

DESCRIPTION OF THE PREFERRED EMBODIMENTS

Microcomputer

Figure 1:
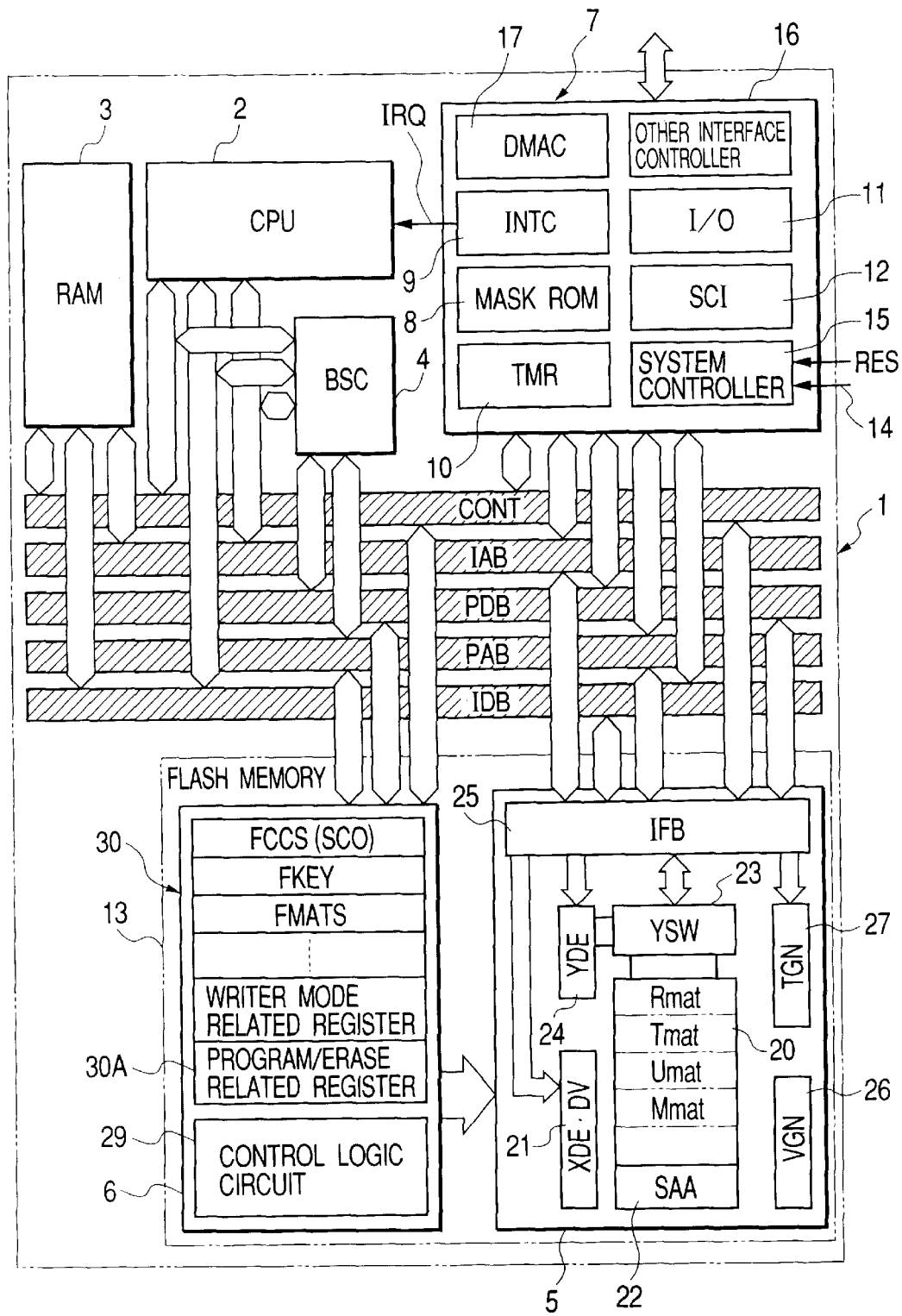
FIG. 1 is a block diagram of the microcomputer of the embodiment of the present invention.

A microcomputer as the data processing device of the embodiment of the present invention is shown in FIG. 1. There are no special limitations on a microcomputer 1 shown in the same figure; however, the microcomputer 1 is formed by CMOS semiconductor manufacturing technology on one semiconductor substrate (semiconductor chip) of monocrystalline silicon.

The microcomputer 1 is comprised of a central processing unit (CPU) 2 as the arithmetic processing unit, a RAM 3 as the nonvolatile memory, a bus state controller (BSC) 4, a flash memory 13 and a module 7 as a general name for the other internal circuits. The flash memory 13 is one example of an erasable and programmable nonvolatile read only memory and includes a flash memory module 5 and a flash control module 6. The module 7 includes a mask ROM 8, an interrupt controller (INTC) 9, a time (TMR) 10, an input/output port (I/O) 11, a serial interface controller (SCI) 12, another interface controller 16, a DMAC (Direct Memory Access Controller) 17 and a system controller 15, etc. These modules functions as the interface by way of the buses IAB, IDB, PAB, PDB, CONT, etc.

The IAB, IDB buses are an internal address bus and internal data bus having comparatively high information transmission speeds. The PAB, PDB buses are a peripheral address bus and peripheral data bus having comparatively slow information transmission speeds. The bus CONT is a general name for a control signal line to transmit bus commands, bus access control signals and timing control signals, etc. The BSC4 optimizes access operation timing to handle differences in operating speed or differences in fixed (characteristic) access status versus the access target, between the internal buses IDB, IAB and peripheral buses PDB, PAB. The BSC4 also performs chip selection or module selection according to the particular access address.

A multiple bit mode signal 14 and the reset signal RES are input externally to the system controller 15. When the reset signal RES goes to low level due to power-on reset of microcomputer 1 or hardware reset, the microcomputer 1 is internally reset during this low level period. After canceling reset with the reset signal RES, the operating mode of the microcomputer 1 is decided according to the multiple bit mode signal 14. The CPU2 reads the reset vector of the program area according to that operating mode, fetches that address command, decodes the command that was fetched, and starts executing the command.

The RAM 3 is utilized as the CPU 2 work area or as a temporary memory storage area for data or programs. The mask ROM 8 is utilized as a memory storage area for data tables, etc. The flash memory module 5 is utilized as a memory storage area for programs and data for the CPU 2.

The interrupt controller 10 is input with an interrupt (break-in) request from an internal circuit module, according to the internal status of microcomputer 1 or an interrupt request from outside of the microcomputer 1. Interrupt mask processing is performed to establish the interrupt (break-in) priority level and to arbitrate rival interrupt requests, in compliance with the interrupt priority level and the interrupt mask, etc. The interrupt controller 10, along with applying an interrupt signal IRQ to the CPU according to results from interrupt mask processing and arbitration of interrupt requests, also applies an interrupt request to the CPU 2 according to the cause of the interrupt request that was received. The CPU 2 distributes (branches) the processing to the specified programs according to the interrupt vector address. The interrupt controller 9 receives interrupt mask data (IMSK) from the CPU 2, and masks (out) interrupt requests whose priority level is lower than the priority level specified in this interrupt mask data (IMSK).

The I/O 11 connects to the external address bus and external databus, and is utilized for the SCI12 external interface, external event signal input for the TMR 10, and in the external interface for the that interface controller 16. The interface controller 16 is for example, compatible with interfaces such as ATAPI or SCSI.

Figure 2:
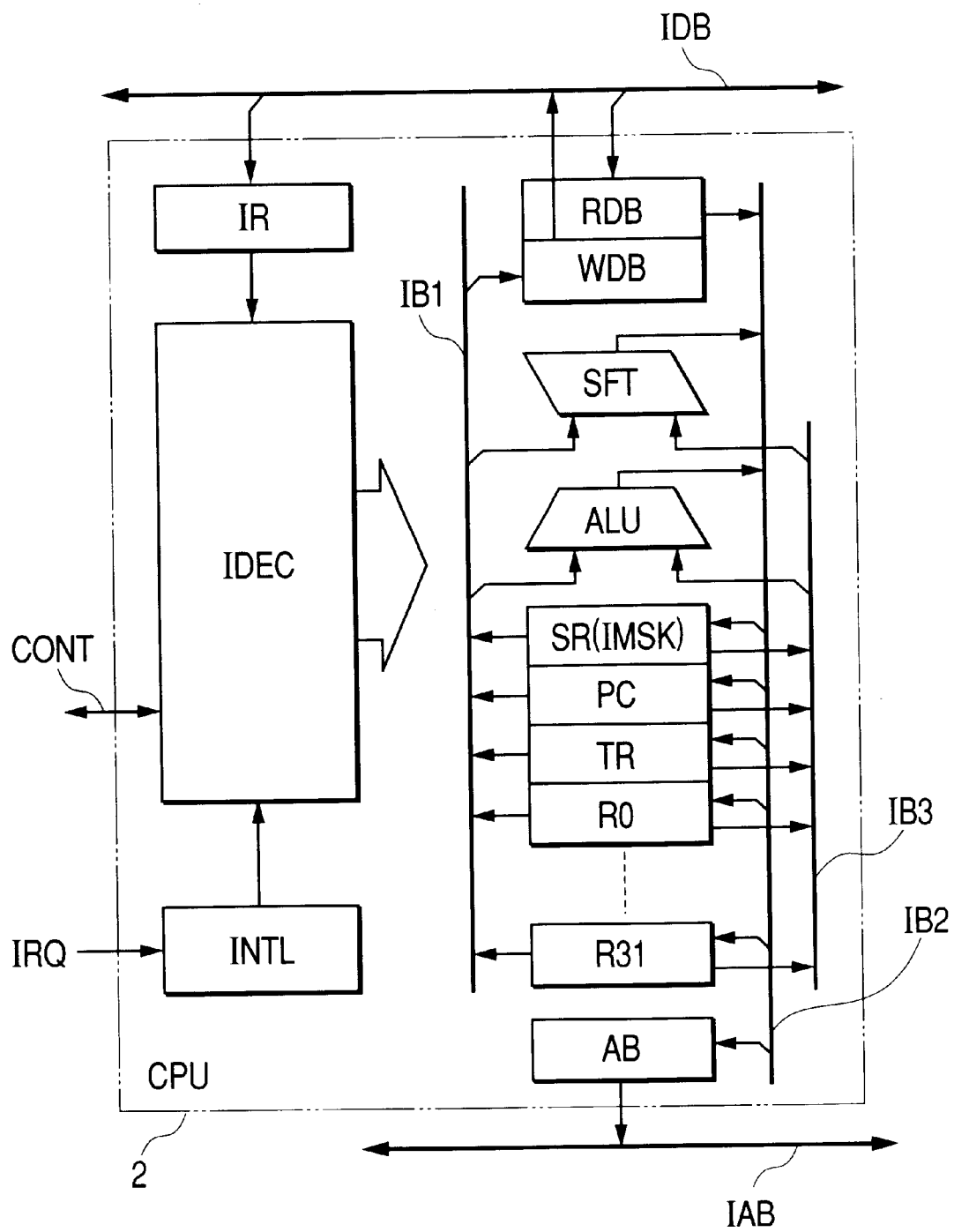
FIG. 2 is a block diagram showing a detailed example of the CPU 2.

A more detailed example of the CPU 2 is shown in FIG. 2. There are no particular restrictions on the CPU 2 but has processors such as a shift SFT and ALU (arithmetic logic unit), a 32 bit general-purpose registers R0–R31, a program counter PC, register group such as the status register SR and temporary register TR, and buffer circuits such as the read data buffer RDB, program data buffer WDB and address data buffer AB for implementing operations and, these components are connected to a specific bus from among the first through third internal buses IB1–IB3. The CPU2 has a command register IR, command decoder IDEC, and command sequence logic INTL as command control sections. 49

The read data buffer RDB supplies data input from the 32-bit data bus IDB to the internal bus IB2. The status register SR has an interrupt mask data IMSK field. The interrupt mask data IMSK is applied to the controller 9. The interrupt controller 9 masks (out) interrupt requests having a priority level lower than shown by the interrupt mask data IMSK.

The program counter PC includes the next command addresses to be implemented, and when these command addresses are output from the address buffer AB to the address bus IAB, the command read-out from the corresponding address for example in the RAM 3, is fetched by way of the internal data bus IDB from the command register IR. The command decoder IDEC decodes the commands in the command register IR and generates control signals inside the CPU 2, to control processing for implementing operations. The command sequence logic INTL changes and controls the command execution sequence in response to the interrupt signals IRQ, etc.

In FIG. 1, a flash memory module 5 includes a memory cell array 20, an X decoder-driver (XDE•DV) 21, a sensing amp array (SAA) 22, a Y switch array (YSW) 23, a Y decoder (YDE) 24, an input/output circuit (IFB) 25, a power supply circuit (VGN) 26 and a timing generator (TGN). The memory cell array 20 includes flash memory cells such as electrically erasable and programmable memory elements (not shown in drawing) arrayed in a matrix. There are no particular restrictions on the flash memory cell but it has a source or drain on the semiconductor substrate or well region, and floating gates and control gates formed in a stack structure from insulating film above the channel, and the source is connected to a source line, the drain is connected to the bit line, and the control gate is connected to the word line.

The flash memory is programmable by threshold voltages, and retains information according to the programmed threshold voltages. When one flash memory cell for example, holds one bit of information, a relatively high threshold voltage state is called program status, and a relatively low threshold voltage state is called erase status. There are no particular restrictions on the programming operation for setting program status but 10 volts is applied to the control gate, and 5 volts for example to the drain, and for 0 volts for example is applied to the source and substrate, electrical current us made to flow between the source and drain, hot electron injection thus performed, electrons accumulated in the floating gate, and the threshold voltage of the memory cell becomes high. There are no particular restrictions on the erase operation for setting erase status but 10 volts for example is applied to the control gate, and a −10 volts is applied to the source and substrate, and the drain opened (set to floating), the electrons accumulated in the floating gate are discharged to the substrate, and memory cell threshold voltage in this way becomes low.

The input/output circuit 25, inputs addresses, control signals and commands between the IAB, IDB, PAB, PDB and CONT buses, and also inputs and outputs data. The address signals input to the input/output circuit 25 are each input to the XDEC, DV21 and DE24 and decoded. The XDEC and DV21 select word lines according to those decoding results. The YDE24 selects bit lines via the YSW23 according to those decoding results. The flash memory cell is selected according to the selected word lines and selected bit lines. In the read-out operation, the data read-out from the selected flash memory cell is detected by the SAA22, and output to the PDB or IDB by way of the input/output circuit 25. In the programming operation, the program data applied to the input/output circuit 25, from the PDB or IDB bus is latched in a program-latch circuit in the input/output circuit 25, and program or program-prohibit of the latch data performed on the memory cell for the selected word line. The flash memory cell is erased in block units prior to performing program.

The power supply circuit 26 includes a clamp circuit or charge pump circuit, and supplies different voltages for operations such as programming, read or erasure of the flash memory cell. The timing generator 27 controls the interface of the flash memory with external sections based on commands input by way of data bus PDB, IDB and strobe data supplied by way of the control bus CONT.

The flash control module 6 in FIG. 1, includes a control logic circuit 29 and control registers 30 for program transfer for erase and program of the flash memory module 5. FIG. 1 shows the typical FCCS, FKEY, FMATS and writer mode registers and program-erase registers utilized as control registers. The memory storage area of the RAM 3 and the general-purpose registers of the CPU 2 are also utilized to control the erase and programming operations on the flash module 5.

Memory Mat for Flash Memory

Figure 3:
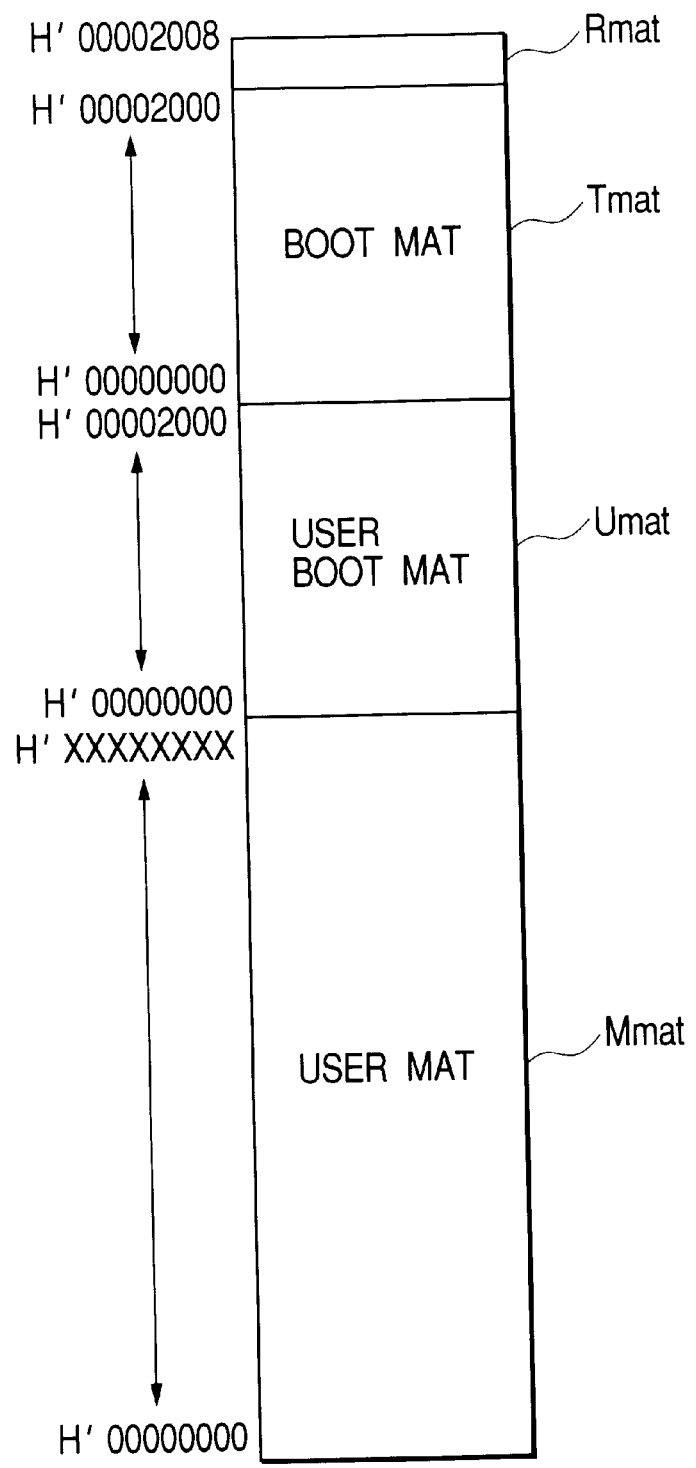
FIG. 3 is a drawing for illustrating the memory mat of the flash memory.

An example of a memory mat for the flash memory is shown in FIG. 3. The module 20 of flash memory 5 includes an electrically erasable and programmable (writable) boot mat (first area) Tmat, a user boot mat (second area) Umat, user mat (third area) Mmat, and a repair and trimming mat RMAT. The boot mat Tmat, user boot mat Umat and user mat Mmat are each assigned a 0 address (H'0000000) as a start address in the memory space, in the beginning address of the CPU 2 address space. The boot mat Tmat, user boot mat Umat and user mat Mmat are in other words, overlapped in the address space, and address decode logic selected according to instructions from the address decoder YDEC and XDEC•DV as to what mat to utilize. What mat to use is determined according to the microcomputer operating mode specified in the mode signal 14. The repair and trimming Rmat stores data for the trimming circuit for adjusting to the fault rescue address and circuit characteristics of the memory cell array.

Operating Mode

Programs for erase and programming in flash memories have become more complicated as the device processing generations increase. A large mode is placed on the user if creating erase and programming programs is necessary. The microcomputer 1 is designed to reduce the burden on the user of creating erase and programming programs by allowing erase and programming to be performed in any mode with a simple procedure. In particular, changing the process flow or adjusting parameters such as the high voltage pulse application time for erase and programming on the flash memory 31 can be implemented by software without having to rely on hardware, so no load is placed on the user, and an operating mode provided for erasing or programming in a simple procedure. To briefly explain this, the erase and programming contained in the boot mat Tmat can be referred to from any operating mode, and the boot mat Tmat program also has a section on security so that the user can utilize the program within a range that will not cause problems.

The operating mode of the microcomputer 1 is next explained in detail. To perform erasing and programming on the flash memory 31, the microcomputer 1 has a writer mode, a boot mode (first mode), user boot mode (second mode), and user mode (third mode). There are no particular restrictions but the mode signal 14 is a 2 bit signal, the system controller 15 decodes those logic value combinations, and then determines if the writer mode, boot mode, user boot mode or user mode is the designated operating mode.

The writer mode is an operating mode for enabling erase and programming on the flash memory 13 using a programming device such as an EPROM writer. When the writer mode is designated, after reset, the CPU 2 fetches the vector from the lead (beginning) address of the boot mat Tmat and starts (starts from the boot mat) executing the program. A command check program and an erase and programming program are all sent to the RAM 3 for processing required in the writer mode. Then, the CPU 2 switches to executing the program sent to the RAM 3, and the flash memory 13 is enabled for erasing and programming by the EPROM writer. This writer mode is suited (configured) for storing the optional user control program on the user mat Mmat and user boot mat Umat while off-board (a state where the microcomputer is not mounted in the system board).

The boot mode is an operating mode for erasing all of mats Tmat, Umat, Mmat, and using SCI12 to enable programming (programming). Along with processing the boot mat Tmat program with the CPU 2, this mode disables erase and program on the applicable boot mat Tmat. More specifically, when boot mode is designated, the CPU 2, after reset, fetches the vector from the lead (beginning) address of the mat Tmat and starts executing the program. Then, the programs in the boot mat Tmat relating to erase and program and command check programs required for processing in boot mode are sent to the RAM 3. After finished sending these programs, and after other processing is completed, the CPU2 executes the program on the RAM 3. After erasing all the mats Umat, Mmat executed by the programs on the RAM 3, the command check program is started and programming enabled by utilizing SCI12. This boot mode is provided on-board with a serial communication interfaces and is suited (configured) for storing optional user control programs such as the user mat Mmat and user boot mat Umat.

The user boot mode is an operating mode for making the CPU 2 process the program in the user boot mode Umat and implement erase and program using an optional user interface. Erasing and programming on the boot mat Tmat and the user boot mat Umat in this operating mode is impossible. More specifically, the user boot mode starts up from the boot mat Tmat, and along with the CPU 2 executing the program in the boot mat Tmat, sends a user boot mat switching program to the RAM 3. Then, the CPU 2 shifts to executing the program on the RAM 3. In executing the program on RAM 3 by the CPU 2, the mat on the flash memory 13, is switched from the default user mat Mmat, to the user boot mat Umat, as seen per the address space in the CPU 2, and a jump is made to that area after reading out the user boot mat Umat vector address. If a security measure has been applied, then the jump is made after erasing the user mat Mmat. When programming, the SCO mode described later on is used and after downloading the necessary erase and programming program from the boot mat Tmat to the RAM 3, that erase and programming program is utilized to perform programming on the user mat Mmat. In other words, a dedicated user interface is provided in the user boot mat Umat, and programming data that matches the user board can be sent. The user boot mode, utilizes an on-board interface provided in the user system board, and is suited (configured) for programming user control programs on the user boot mat Mmat. Erasing of the user boot mat Umat is prevented in this operation. The user system board is therefore not provided with a serial interface, and even if boot mode cannot be utilized on-board, the programming can instead be guaranteed by way an on-board interface provided on the user system board.

The user mode is an operating mode for enabling erase and program by utilizing a program stored in the user mat Mmat. Erasing and programming on the boot mat Tmat and user boot mat Umat is impossible in this mode. More specifically, the CPU 2 is started from the user mat Mmat, and the program executed on the user mat Mmat. In particular, when required by the user, the boot mat Tmat and user mat Mmat are automatically switched to enable the SCO mode described later on, the program starts up from the address of the boot mat Tmat, the erase and programming program on the boot mat Tmat is transferred to the RAM 3, and when transfer of the program is complete, the boot mat Tmat and user mat Mmat are automatically switched, user processing resume, the erase and programming program is utilized in the user program, and erase and program are enabled on the user mat Mmat. In other words, the SCO mode described later on is utilized in the user program mode and the erase and programming program on the boot mat Tmat is transferred to the RAM 3 and that program can then be utilized. This user mode is suited (configured) for programming parameters on the user mat Mmat during execution of the onboard user control program.

FIG. 4A and FIG. 4B are drawings showing access status in each mode of each mat. The access status shown in this figure, in an ordered state of the access status for the above described operating modes. As can be clearly understood from the figure, erasing and programming are impossible in any operating modes for repair and trimming mat Rmat and boot mat Tmat. Erasing and programming for the user boot mat Umat are impossible in the user boot mode and user mode (user program mode) implemented by the user control program. This user boot mode utilizes an onboard interface provided in the system board of the user, and is configured (suited) for programming the control programs of the user in the user mat Mmat. Erasure of the user boot mat Umat is prevented in this operation. The user system board is therefore not provided with a serial interface, and even if boot mode cannot be utilized on-board, the programming can instead be guaranteed by way an on-board interface provided on the user system board. The term "access" shown in FIG. 4 indicates read-access, and the symbol Δ signifies that read-access is enabled in compliance with the program stored in the boot mat, and does not signify that optional read-access is possible in compliance with the user control program.

Figure 5:
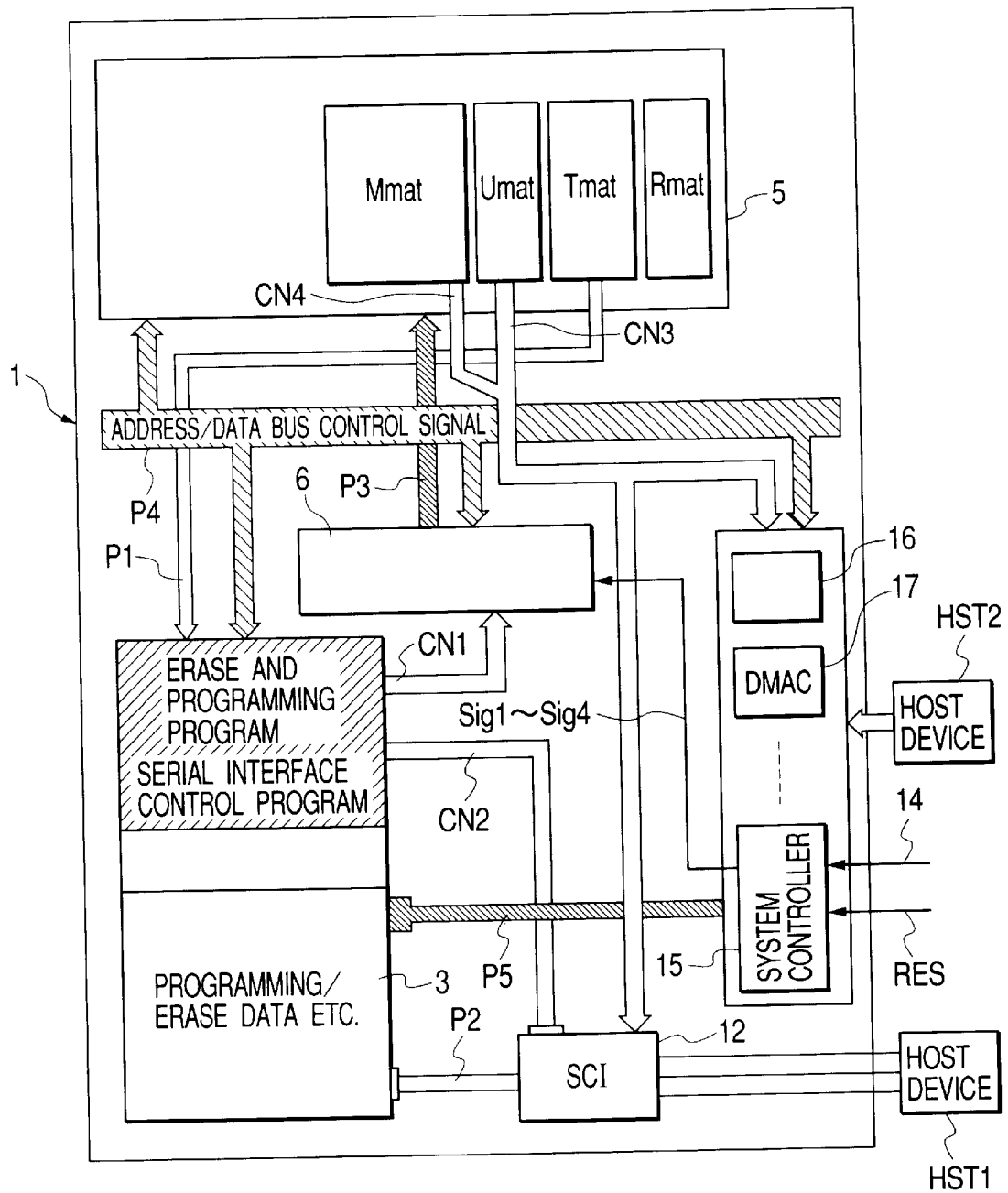
FIG. 5 is an explanatory drawing showing the effect per the location and execution of the program by the CPU.

FIG. 5 is an explanatory drawing showing the effect per the location and execution of the program by the CPU. The CPU 2 is omitted from the FIG. 5. In this figure, CN1 is temporarily assumed a control signal group for results decoded by the CPU 2 of the erase and programming program transferred to the RAM 3 from the boot mat Tmat. CN2 is temporarily assumed a control signal group for results decoded by the CPU 2 of the serial interface program transferred to the RAM3 from the boot mat Tmat. CN3 is temporarily assumed a control signal group for results decoded by the CPU 2 of the user interface program of the user boot mat Umat. CN4 is temporarily assumed a control signal group for results decoded by the CPU 2 of the user interface program of the user mat Mmat. The control signals CN3, CN4 are shown in the figure as decoded results of programs directly fetched from the user boot mat Umat and the user mat Mmat, however these may be decoded results of programs transferred to the RAM 3 and then fetched from the RAM 3. In the figure, Sig1–Sig4 signify decoded results of the mode signal 14 after resetting by the system controller 15, and Sig1 signifies the boot mode, Sig2 is the user boot mode, Sig3 is the user mode, and Sig4 is the program mode. These signals Sig1–Sig4 are in fact also supplied to the CPU 2 however that state is omitted from the figure.

When the boot mode is specified by the mode signal 14, the erase and programming program and serial communications program (etc.) of the boot mat Tmat, are transferred to the RAM 3 by the flash control module 6 in response to the signal Sig1 (path P1). The program data from the onboard serial interface in the host device HST1 is loaded by the CPU2, into the RAM 3 (path P2) per the decoded results (CN2) of that serial communications program, and the flash memory 13 is erased by the CPU2 in accordance with decoded results (CN1) of the erase and programming program, and the user control program is written (path P3, P4) on the user boot mat Umat and user mat Mmat utilizing the programming data on the RAM 3.

When the user boot mode is specified by the mode signal 14, a control program to switch the mat from the boot mat Tmat is sent to the RAM 3 (path P1) by the flash module 6 in response to signal Sig2, which switches to the user boot mat Umat, and the lead (beginning) vector of the user boot mat Umat is fetched and implemented. The erase and programming program is downloaded to the RAM 3 from the boot mat Tmat when performing programming. The program data from the onboard user interface in the host device HST2 is loaded into the RAM 3 (path P5) per the decoded results (CN3) of that user interface program contained in the user boot mat Umat, and the flash memory 13 is erased by the CPU 2 per the decoded results (CN1) of the erase and programming program, and programming of the user control program and user data is performed (paths P2, P4) on the user mat Mmat utilizing the program data on the RAM 3. The user interface is for example, an ATAPI interface implemented by, among others, an interface controller 16. The user interface program stored in the user boot mat Umat, may be the same as that stored in the boot mat Tmat or may be a separate serial interface program.

When the user mode is specified by the mode signal 14, that (information) is conveyed to the flash control module 6 by the signal Sig3, and when performing programming, the erase and programming program is downloaded to the RAM 3 from the boot mat Tmat. The program data is loaded into the RAM 3 (path P5) from the onboard user interface in the host device HST2 according to the decoded results (CN4) of the user interface program stored in the user Mmat. The flash memory 13 is erased by the CPU 2 according to the decoded results (CN1) of the erase and programming program, and programming of user control program and user data is performed (paths P3, P4) on the user mat Mmat utilizing the program data on the RAM 3. The user interface program stored in the user mat Mmat, may be the same as stored in the boot mat Tmat or may be a separate serial interface program.

Though not specially designated in the drawings, a microcomputer assumed not to be provided with the user boot mat Umat and the user boot mode is assumed as a comparative example for the microcomputer 1. In this case, if the user interface program stored in the user boot mat Umat, is stored in the user mat Mmat, then programming or programming of programs and data into the user mat Mmat can be performed via the onboard user interface of the host device HST2, the same as in the microcomputer 1. However, as also with the microcomputer 1, given the circumstances that programming of the user mat Mmat is freely allowed, the user interface program stored in the user mat Mmat is erased. If the host device HST2 is not provided with an onboard serial interface usable in boot mode, then when the user mat Mmat is erased, the microcomputer constituted by the comparison sample, will be unable to input and output information, onboard with the fastest host HST2.

The microcomputer 1 having the above described operating modes is capable of rendering the following effects. (1) An optional interface provided in the microcomputer 1 is capable being used for flash memory 13 erasing and programming since a user boot mat Umat is provided that is capable of storing the dedicated user communication protocol. (2) A serial interface need not always be provided in the host device HST2 since an optional user interface can be utilized for erase and programming of the flash memory 13. (3) A user optional program interface can be achieved for erase and programming, by separating the user boot mat Umat and the user mat Mmat so that a dedicated communication protocol does not have to written in the user mat Mmat, and therefore a control program for storage and use in the user mat Mmat can easily be created. In other words, no special measures need to be taken for preventing erasure of the communications program used in the user program mode. (4) Erasing and programming of the user boot mat Umat by hardware is impossible in the user boot mode started up from the user boot mat Umat, so information stored in the user boot mat Umat will not be destroyed if the system runs out of control, and even if the CPU 2 runs out of control during debugging, the program controlling the external interface will not be damaged so that the user mat Mmat can be freely programmed onboard, and without having to remove the microcomputer chip that was installed.

Erase and Programming Protect

Figure 6:
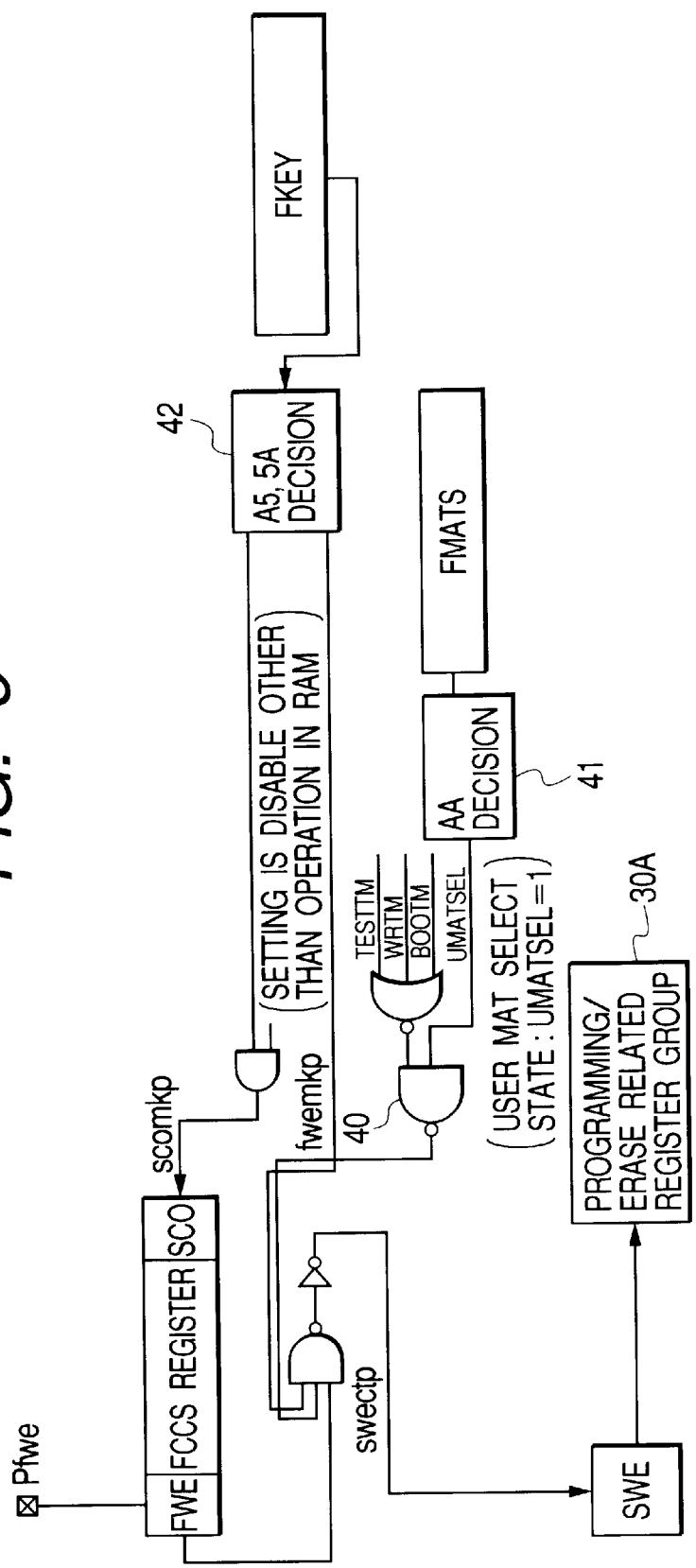
FIG. 6 is a logic diagram of the logic configuration for erase and program protect of the flash memory.

FIG. 6 is a drawing showing the logic configuration for erase and programming protection on the flash memory 13. The logic in this figure is positive logic, and its configuration is determined by the flash control module 6.

Erase and program of the flash memory is enabled by setting the initial values of the programming/erase related register group 30*a* to the control data required for the processing. In these control data settings, the control bit SWE is set to a logic value "1" on the programming/erase related register group 30*a*. In other words, erase and programming on the flash memory 13 is impossible unless the control bit SWE is set to a logic value "1".

A first condition for setting the control bit SWE to a logic "1" is that is that the enable bit FWE of the register FCCS be set to "1" on the external terminal Pfwe.

A second condition is that a status be set for selecting the flash memory mat and selecting the operating mode for setting the output of the NAND gate 40 to a logic "1" value. In other words, the operating modes shall be test mode (TESTTM=1), writer mode (WRTM=1), or the boot mode (BOOT=1). Or that the user boot mat Umat not be selected (UMATSEL=0) in user mode or user boot mode. The test mode is an operating mode used by the microcomputer manufacturer for device testing, all operations are enabled however operating modes not open to the user, or in other words, measures are taken so that the user cannot make settings.

Figure 7:
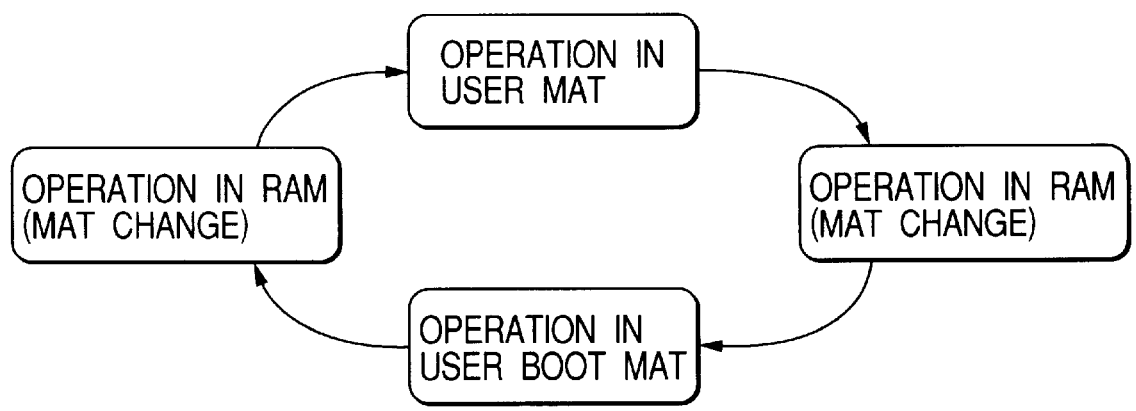
FIG. 7 is a drawing showing operation transition when the CPU is switching between the user mat and the user boot mat.

The signal UMATSEL is the result of decision circuit result 41 from the register FMATS and applicable FMATS register. The register FMATS is used to switch between the user mat Mmat and user boot mat Umat. By using this FMATS register, the CPU 2 operation can be shifted from the user mat Mmat to the user boot mat Umat. However, there are restrictions on switching the mats. Namely, a condition for setting the user boot mat select bit on the FMATS register is that the CPU 2 is executing the RAM 3 program. The BSC4 detects that the command fetch address area per the CPU 2 is the address area of the RAM 3 to decide the condition (is satisfied). An initial value of other than H'AA on the FMATS register indicates user mat selection status. User boot mat selection status is shown by the value H'AA. FIG. 7 shows the transition status when CPU 2 operation (OP) is switching between user mat Mmat and the user boot mat Umat.

This second condition allows accessing the user boot mat Umat from any mode, however erase/programming in only possible in the writer mode and boot mode (as well as the test mode).

A third condition is that the register FKEY be set to a value enabling the erase/program. The register FKEY was installed to prevent the program from being damaged due to voltage drops or noise causing the program to run out of control. When the program runs out of control after the erase and programming program has been sent, the FKEY is then used. Erase/programming will basically not be executed even if the CPU 2 runs out of control, due to the terminal Pfwe and the control bit SWE. However, to further improve reliability, the user sets the register key to the "5A" value prior to performing program or erase. If this "5A" is not stored, the control bit SWE cannot be set even if the FWE was set to enable ("1"). A state where "5A" is stored in the register FKEY, is detected by the A5, 5A decision circuit 42, and signal fwemkp set to 1, and in this way, SWE can be set to a logic value of "1".

Besides its program/erase program related function, the register FKEY also functions in program transfer. Namely, in order to transfer the boot mat Tmat applicable erase and programming program to the RAM 3 after storing the erase and programming program of the flash memory boot mat Tmat, and enabling the user boot mode and user mode for use; the control bit SCO is set in the register FCCS, and when the control bit SCO is enabled, the user mat Mmat and the boot mat Tmat are automatically switched, the erase and programming program from the boot mat Tmat is transferred to the RAM 3, and after completion the return command is executed, and restored for user processing. If the program runs out of control at this time, at a point where the user does not want to perform program or erase, there is a high probability that the user program will be destroyed when the erase and programming program is transferred. The register FKEY is used to avoid this problem. The user stores an "A5" in the register FKEY before setting the control bit SCO. The control bit SCO cannot be set when this "A5" value is not stored. Further, there is the condition that the CPU 2 is operating a program on the RAM 3. An "A5" that is stored when the CPU 2 is operating the RAM 3, allows setting the SCO bit, and transferring the erase and programming program from the boot mat Tmat to the RAM 3 is then allowed.

In the erase and program on the flash memory 13 as described above, exclusive control of erase/program and transfer of the program is implemented by the register FKEY so that program and erase are hard to execute when the program has run out of control while not yet transferred.

Program Mode Decision Processing

Figure 8:
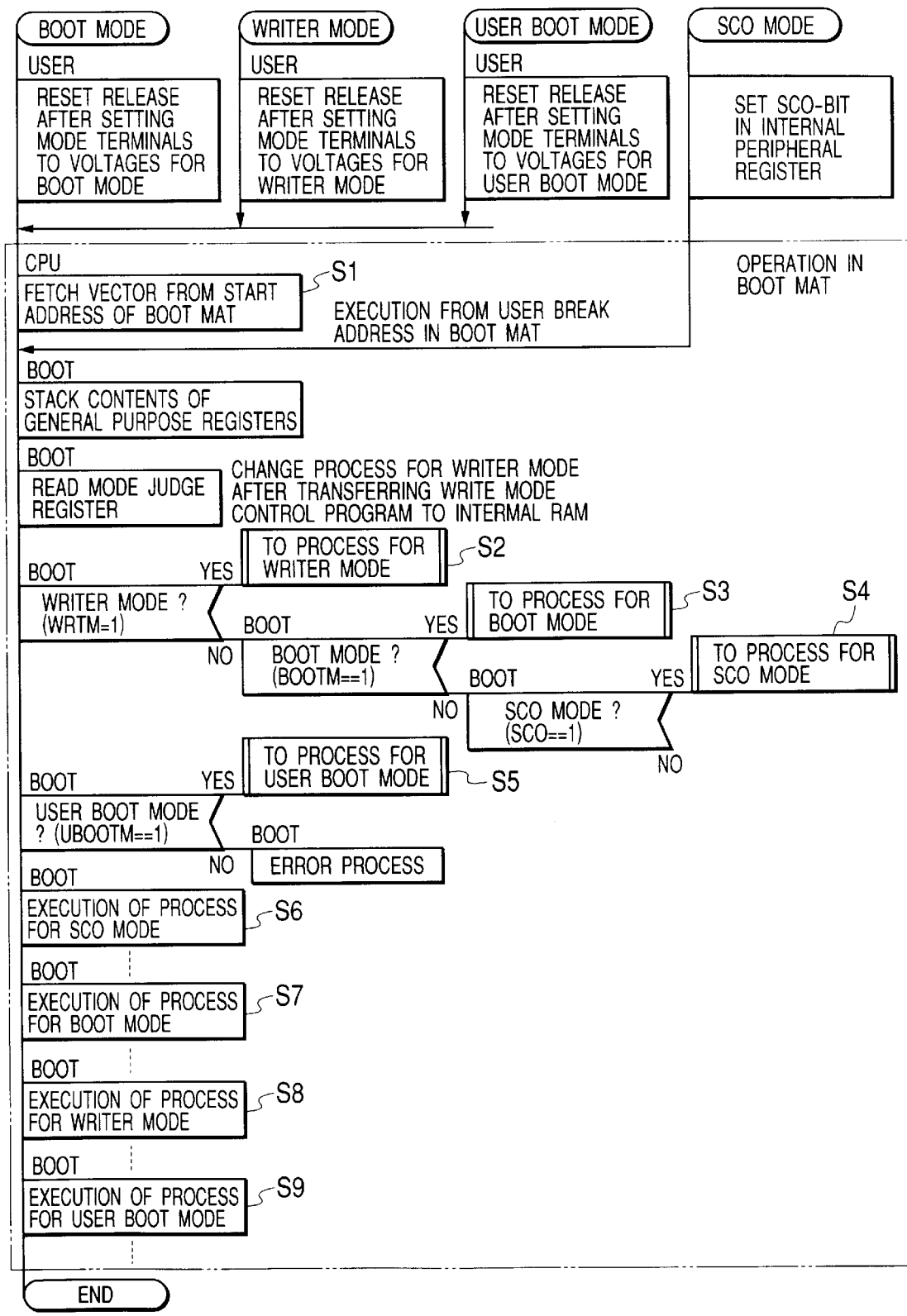
FIG. 8 is flow chart showing program mode decision processing.

The processing for each operating mode is described in detail next. FIG. 8 is flow chart showing program mode decision processing. The term, SCO mode signifies an operating mode when setting erase and programming on the flash memory in user mode. The boot mode, writer mode, user boot mode and user mode can be used for setting or resetting (cancel) a corresponding mode terminal. The SCO mode is set by setting a logic value "1" in the control bit SCO in the user mode. Mode information is set in the mode decision register according to the operating mode that was set.

When the operating mode has been set, the CPU 2 executes the program inside the boot mat (OP inside boot mat). The boot mode, writer mode and user mode fetch the vector from the beginning (lead) address inside the boot mat and start the program (S1). However in the case of SCO mode, the processing is started from a specified address other than the beginning address within the boot mat, so the processing for example, starts from a user interrupt (break-in) address having the highest priority level.

When processing starts, the mode decision register is read (S2), those contents are checked (judged), the necessary pre-processing such as transferring the erase and programming program (S2–S5) is performed, and operation proceeds to the corresponding process (S6–S9). In the process box in the flow charts, "user" signifies processing performed based on a program defined by the user, and "boot" in the process box signifies that the processing is performed based on the boot mat Tmat program.

Writer Mode Processing

Figure 9:
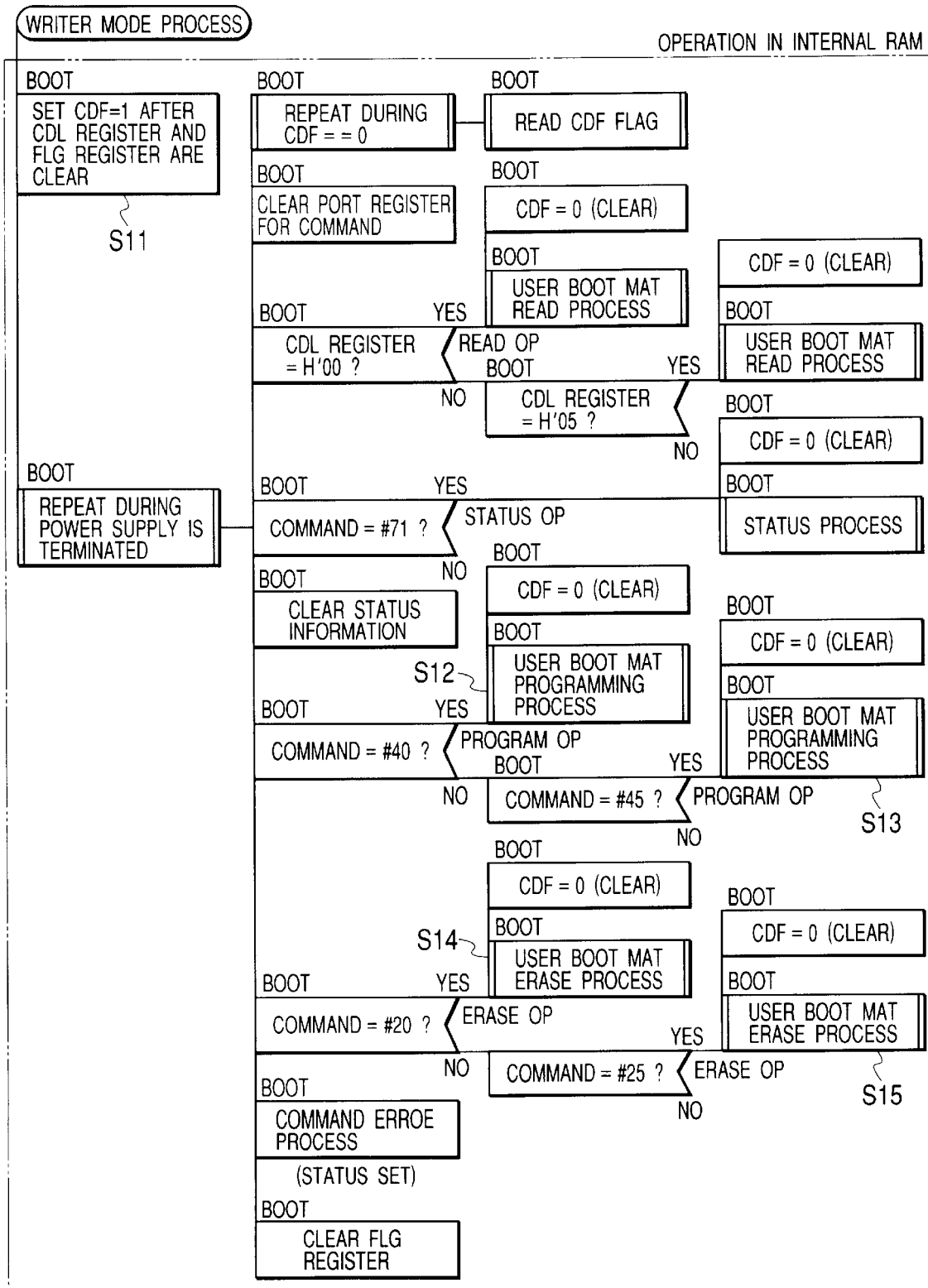
FIG. 9 is a flow chart showing writer mode processing flow.

FIG. 9 is a flow chart showing writer mode processing flow. When the writer mode is installed, the writer mode (control) program is transferred to the RAM 3 as shown in FIG. 8. First of all, in writer mode, the command data register (CDL), flag register (FLG) used in erase and programming are cleared, a "1" is set in the command flag, and erase (S14, S15) and program (S12, S13) are performed on the user mat Mmat and user boot mat Umat according to command and program data set in the command data register (CDL) from the EPROM writer, while referring to the flag register (FLG) and command flag (CDF) until the power is turned off. The writer mode processing is an operation performed inside the RAM 3.

Boot Mode Processing

Figure 10:
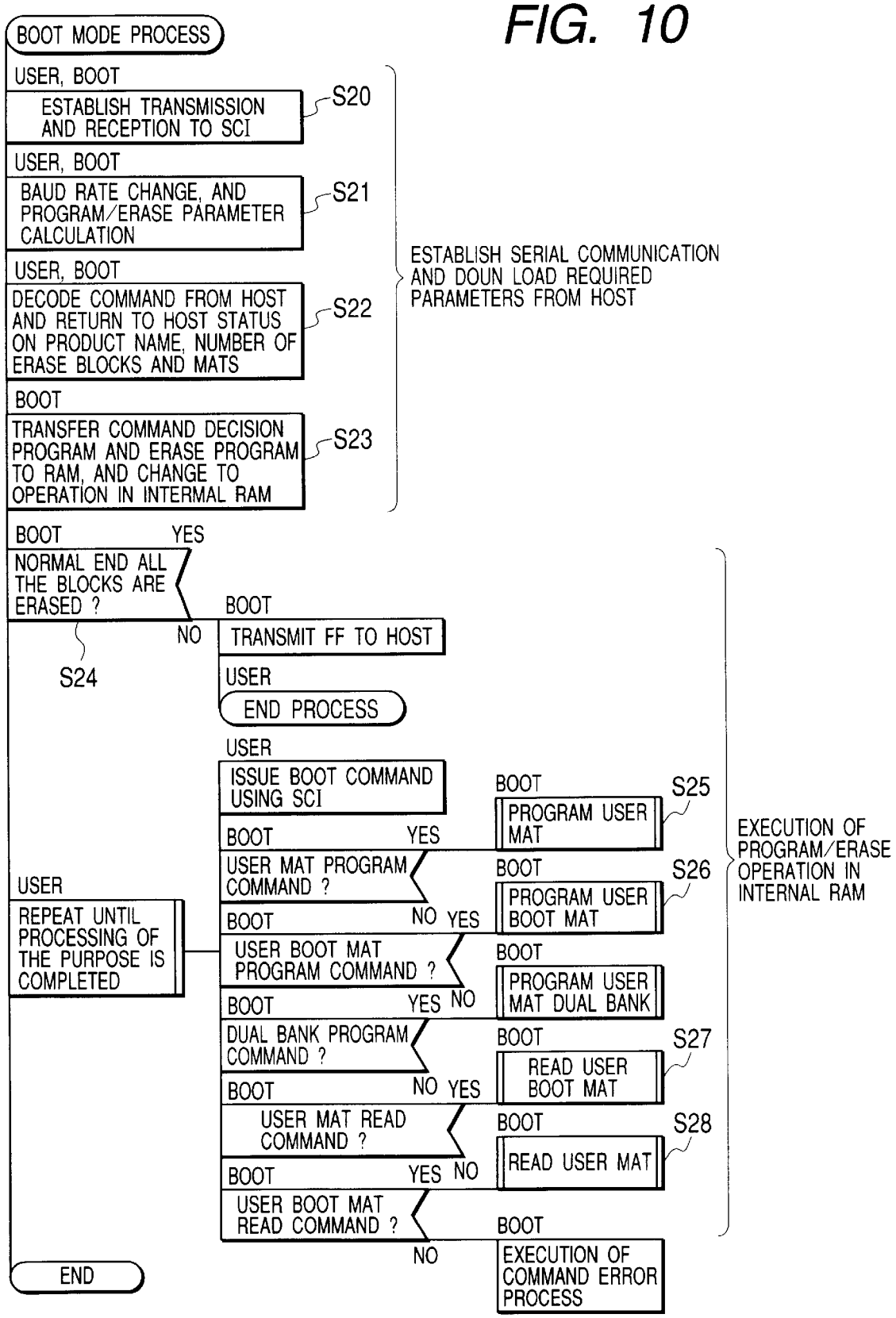
FIG. 10 is flow chart showing the boot mode processing.

FIG. 10 is flow chart showing an example of the boot mode processing. Communication (send and receive) is first established between the SCI12 and the onboard serial interface (S20) and necessary parameters for microcomputer 1 oscillator frequency are downloaded and set (S21). Next, the command from the host device is determined, and the status such as the microcomputer product name and erase block quantity are returned to the host device (S22), the command decision program and the erase program are transferred to the RAM 3 (SCO mode can also be utilized), and the operation shifted to the RAM 3 (S23). Then, after totally erasing the user mat Mmat and the user boot mat Umat (S24), the user mat programming (S25), user boot mat programming (S26) and program-verify (S27, S28) are performed while responding to the commands.

Command Boot Mode Processing

Figure 11:
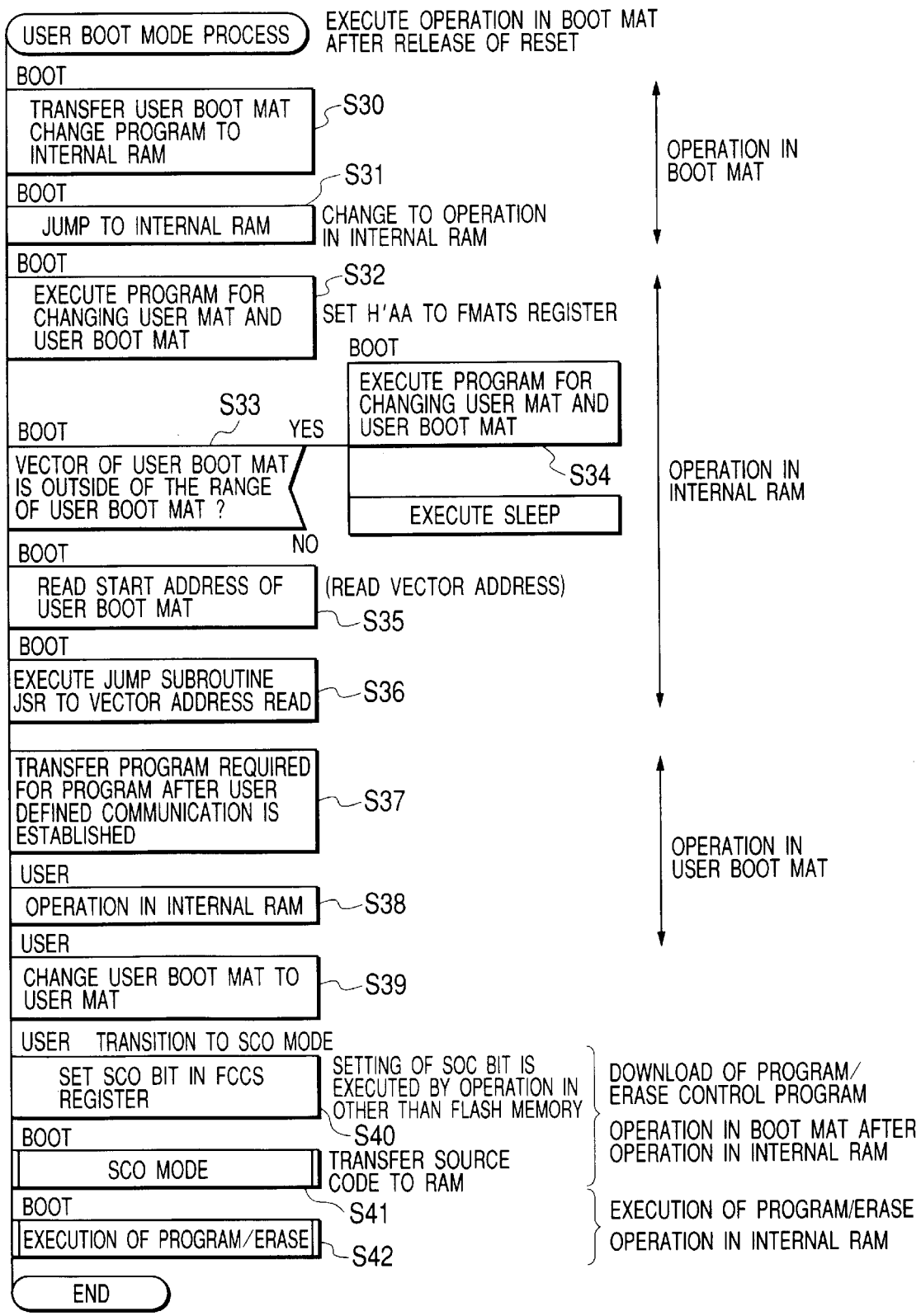
FIG. 11 is a flow chart showing the user boot mode processing.

FIG. 11 is a flow chart showing an example of the user boot mode processing. There are no particular restrictions on the user boot mode however, operation starts from the beginning (lead) vectors of the boot mat Tmat, the program switching to the user boot mat Umat is transferred to RAM 3 from the boot mat Tmat (S30), the operation shifts to the RAM 3 (S31), H'AA is set in the register FMATS, the user boot mode command status (initial values) are switched to the user boot mat UMAT from the register FMATS (S32). Here, a check is made for errors in the user boot mat Umat area setting (S33, S34) and if there are no errors the lead (beginning) vector of the user boot mat Umat is read out (S35), and a subroutine jump made to the vector address that was read out (S36). The CPU 2 executes the program on the user boot mat Umat, and first of all, establishes user-defined communications, and transfers a user program needed for programming, to the RAM 3 (S37). The CPU 2 shifts program execution to the RAM 3 (S38), and once again operates the register FMATS, switching the current mat from the user boot mat Umat to the user mat Mmat (S39). Then, the user program is executed on the RAM 3, and a "1" set in the control bit SCO (S40), operation shifts to SCO mode processing, and the erase and programming program within the boot mat Tmat is transferred to the RAM 3 (S41), and program/erase are performed using the erase and programming program that was transferred (S42).

User Mode Processing

Figure 12:
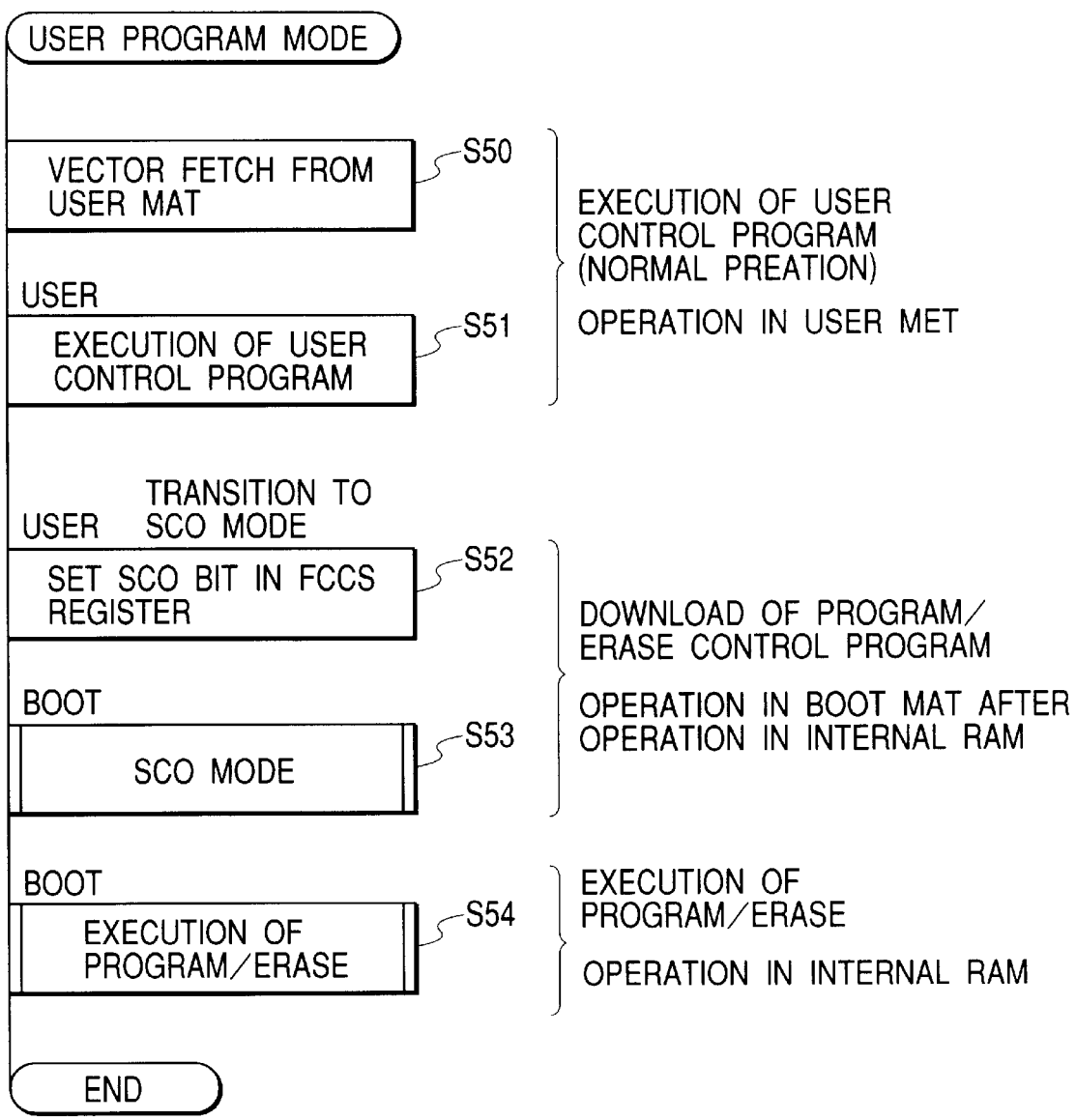
FIG. 12 is a flow chart showing the user mode processing.

FIG. 12 is a flow chart showing an example of the user mode processing. When the user mode is specified, the vector is fetched from the beginning of the user mat Mmat (S50), and the user program is executed (S51). When programming onto the user mat Mmat is necessary during execution of the user program, a "1" is set in the SCO bit performing the operation on the RAM 3 (S52), operation shifts to SCO mode processing, the erase and programming program within the boot mat is transferred to the RAM 3 (S53), and erase/program performed using the erase and programming program that was transferred (S54).

Program/Erase Processing

Figure 13:
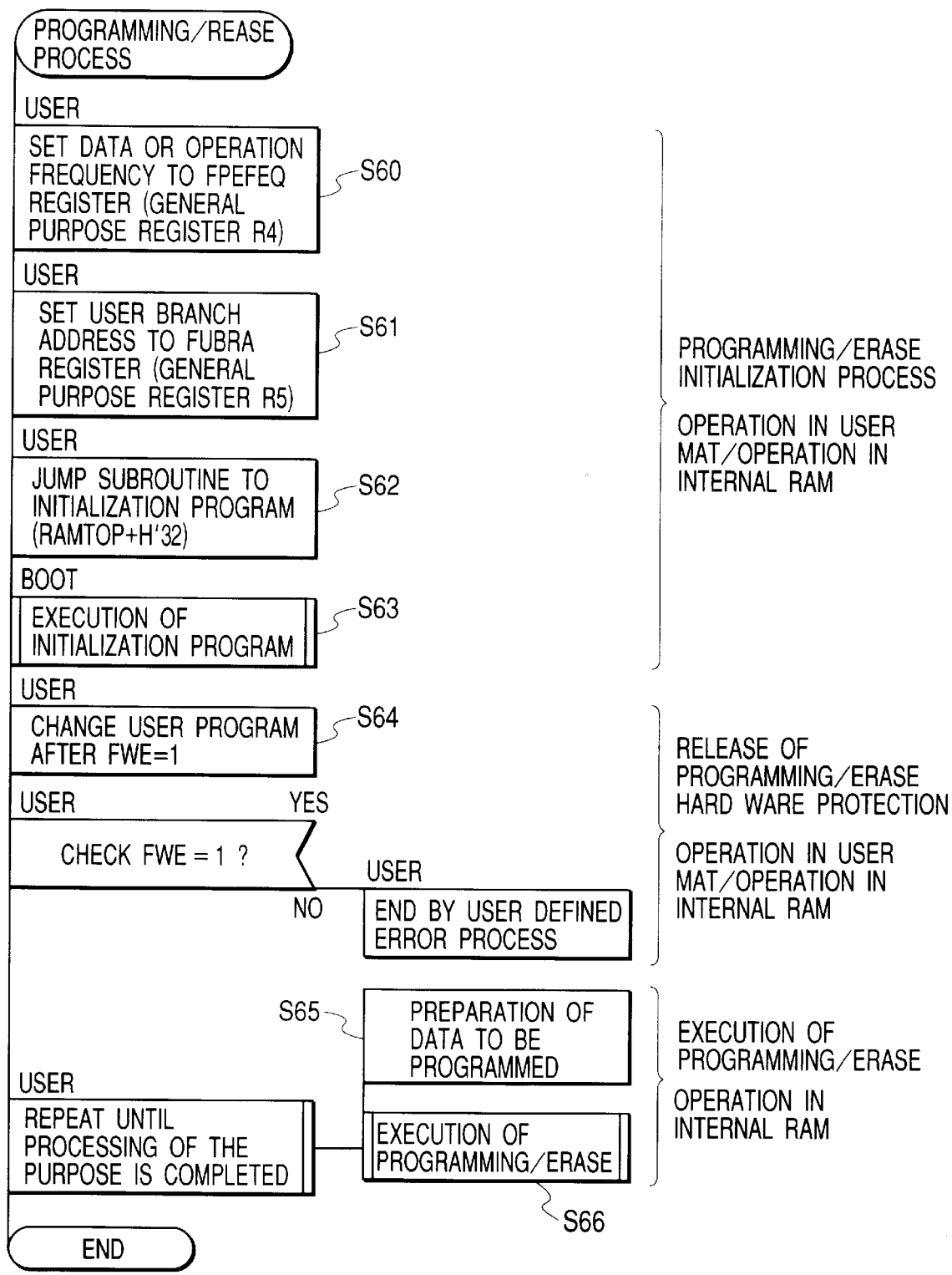
FIG. 13 is a flow chart of the erasing/programming of step S42 in FIG. 11 and step S54 of FIG. 12.

FIG. 13 is a flow chart showing an example of the erase/program processing of step S42 in FIG. 11 and step S54 of FIG. 12. The erase/program processing initialization is performed in steps S60 through S63. Here, the erase and programming program is held beforehand in the boot mat Tmat by the semiconductor manufacturer. In other words, that program does not define user-unique conditions. For example, the application time for the erase voltage pulse and the program voltage pulse are determined according to the characteristics of the flash memory cell however that pulse application time must be regulated by the microcomputer 1 operating clock signal, and the required operating frequency data (for regulating the pulse application time) is set in the FPEFEQ control register (S60). There are no particular restrictions on the FPEFEQ control register however, a general-purpose register R4 of CPU 2 is assigned.

To resolve the problem of user processing being completely cut off during the erase voltage pulse and program voltage pulse as well as the verify operation cycle, a branch processing address for user branch processing (described in detail later on) is set in the FUBRA register (S61).

A subroutine jump is then made to the initialization program area (S62), the initializing program executed (S64), and parameters for erase and program are automatically set in the erase and programming program according to the initialization contents such as the frequency and user latch address.

Next, to cancel the erase and program (hardware) protection, a logic value "1" is set in the control bit FWE by way of Pfwe terminal, and the hardware protection then canceled, and the operation shifts to the user program (S64). The program data is prepared (S65) in this operation status, and the programming and erasing desired by the user is performed (S66). The processing in steps S65, S66 is repeated until the processing the user wants to perform is complete.

User Branch

The user branch routine is next described while further explaining the program/erase processing of FIG. 13.

Figure 14:
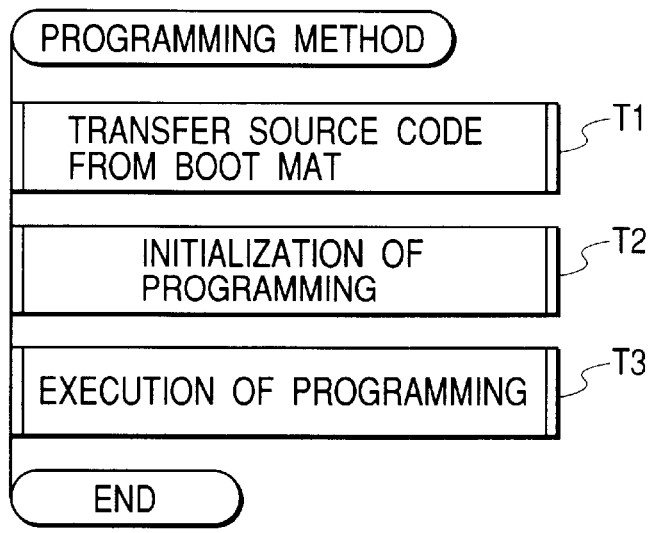
FIG. 14 is a concept flow chart of the programming of FIG. 13.

FIG. 14 is a concept flow chart of the program processing of FIG. 13. The program processing is broadly grouped into the processes of; for transferring the source code (erase and programming program, etc.) from the boot mat Tmat to the RAM 3 (T1), implementing program initializing (T2), and programming (T3).

The transfer process (T1) selects the program to be transferred, sets the register FKEY, and enables the control bit SCO. Implementing this process, automatically starts the transfer of the program from the boot mat. The program is transferred from the start address of the RAM 3 to only the required program area. The initialization program is also transferred at this time.

In the program initializing (T2), the initializing program is executed, and the wait time loop count (dependent on the operating frequency) and the user subroutine address are set for the transferred program.

In the programming (T3), the program data is transferred to the RAM 3 by any suitable method, prior to performing the programming. The data must be arrayed in a predetermined sequence at this time. The transfer area can be set as desired by the user, the required procedure is performed and after the transfer, a subroutine jump is made to the address that was decided for the program. The programming is executed by making this subroutine jump.

Figure 15:
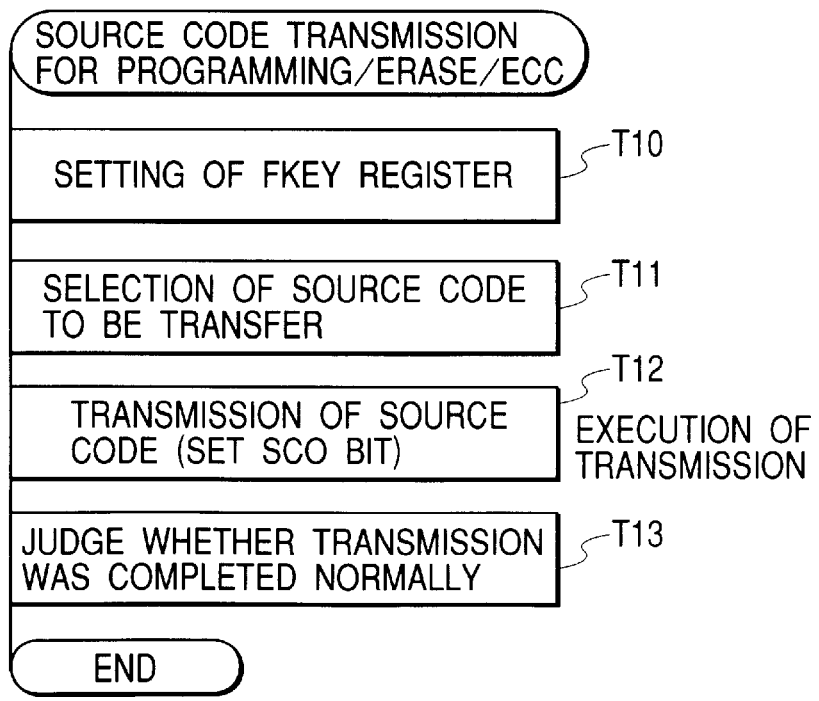
FIG. 15 is a concept flow chart showing details of the transfer process (T1) to the RAM.

The example in FIG. 15 shows details of the transfer process (T1) to the RAM 3. The FKEY register is first of all set to "A5" (T10), and the source code to transferred is selected (T11). The source code is selected on the programming/erase related register group 30a. There are no particular restrictions on the selectable source code but it may be a program and a program-verify program, an erase and an erase-verify program, etc. A "1" is set in the control bit SCO, and the selected source code is set in the specified area on the RAM 3 (T12). When enabling the control bit SCO, the CPU2 performs the operation outside of the flash memory 13. This is due to the fact that the program may run out of control when a mat capable of operation changes from a user mat Mmat to a boot mat Tmat. After enabling the SCO control bit, the program automatically starts from the boot mat Tmat. This boot program stores the general-purpose register values in a stack, by software processing. When returning to user processing, the user processing is restored with a return command. Before restoring the processing, the transfer program inside the boot mat Tmat restores (reinstates) the general-purpose register values that were previously stored. Finally, a check is made to determine if the transfer terminated correctly (T13).

Figure 16:
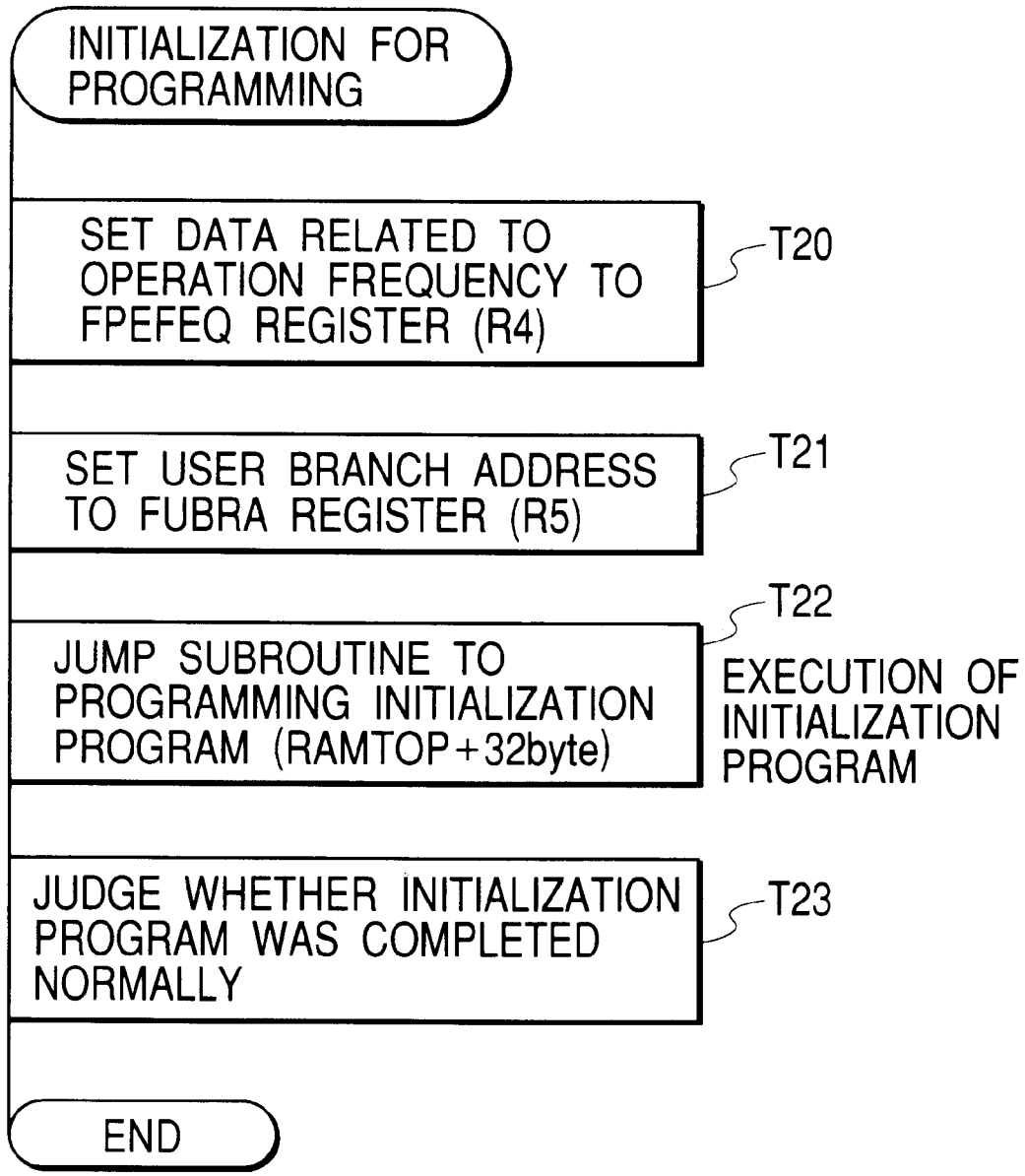
FIG. 16 is a flow chart showing details of the programming-initializing process (T2).

FIG. 16 is a flow chart showing details of the program-initializing process (T2). First of all, the microcomputer 1 operating frequency is set in the FPEFEQ (R4) register (T20), and a user branch address is set in the FUBRA register. The general-purpose register R5 of CPU2 is assigned to the FUBRA register. The program-initializing program is then implemented (T22). In the initializing process for program (processing) for example, the wait time loop count is determined by referring to the chip operating frequency that was set. Processing is then performed to embed the now determined wait time into the programming program on the RAM 3. The program-initializing program executes the user branch or if implemented, makes changes in the programming-program for what address to jump to, while referring to the FUBRA register value (R5). In other words, the FUBRA register value (R5) is incorporated as the branch destination address, into the subroutine jump command for executing the user latch. Finally, a check is made that the initialization process ended correctly (T23) and the processing terminates.

The FUBRA register here is a register for specifying the user branch address in the ongoing programming/erasing, and this area is in the R5 register. The value H'00000000 is set when the user branch is not to be executed. To prevent operating errors from occurring in the user branch, preferably; user branches are prohibited in the area during ongoing program/erase in the flash memory; and user branches are prohibited in the area inside the internal RAM where the program/erase program is transferred, programming of program data is prohibited, and executing of SCO modes, call-up of program/erase routines, and program/erase initializing routines at the destination where the user branch is to be executed are prohibited.

Figure 18:
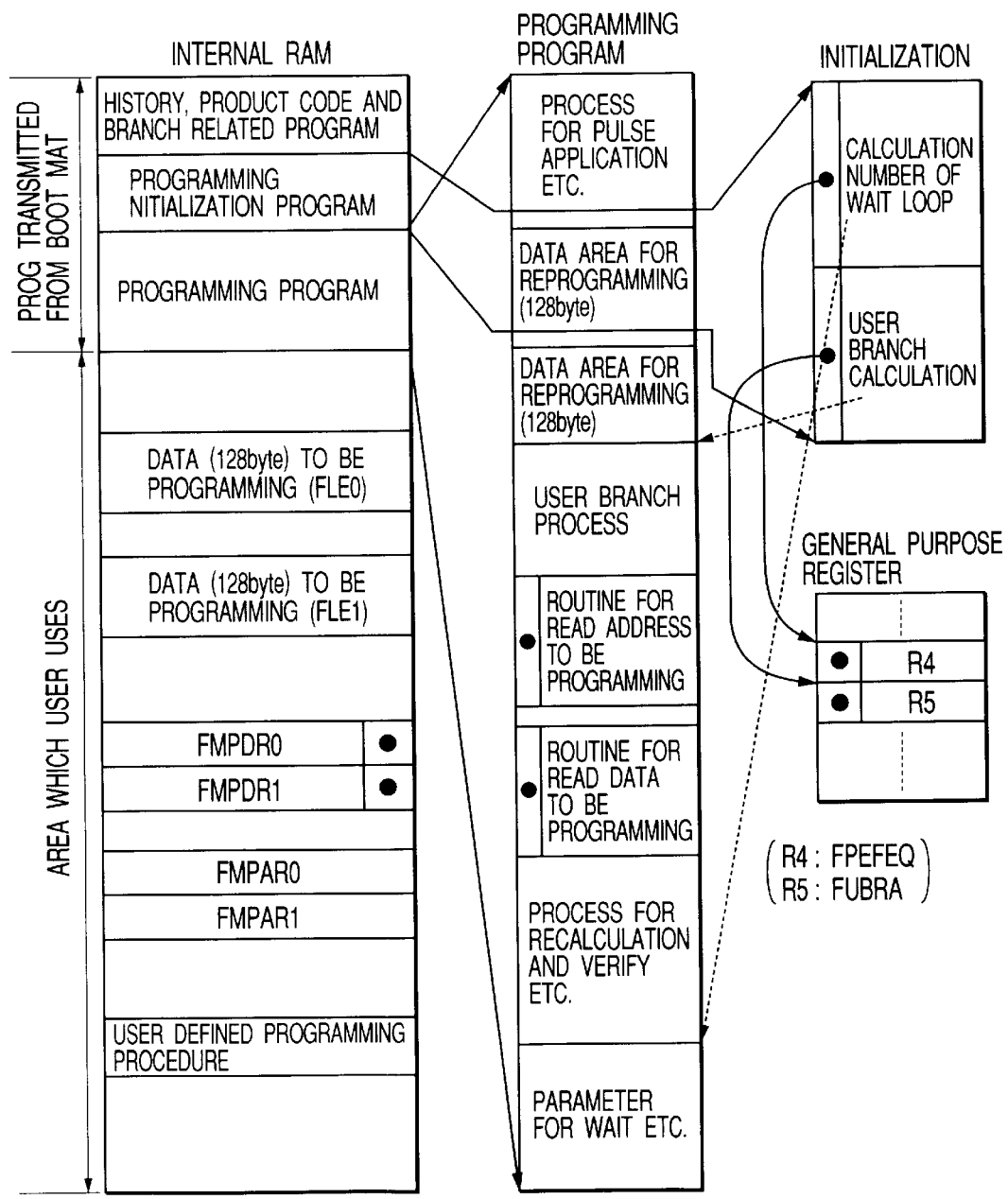
FIG. 18 is a drawing for describing the data connections between internal RAM, programming program, initialization process and registers (R4, R5) during the programming initializing in FIG. 16.

FIG. 18 shows the data connections between internal RAM 3, programming program, initialization process and registers (R4, R5) during the programming initializing in FIG. 16. The initializing program in the figure, reflects results from referring to registers R4, R5 in the user branch processing for the programming program, and clearly shows them in wait related parameters.

Figure 17:
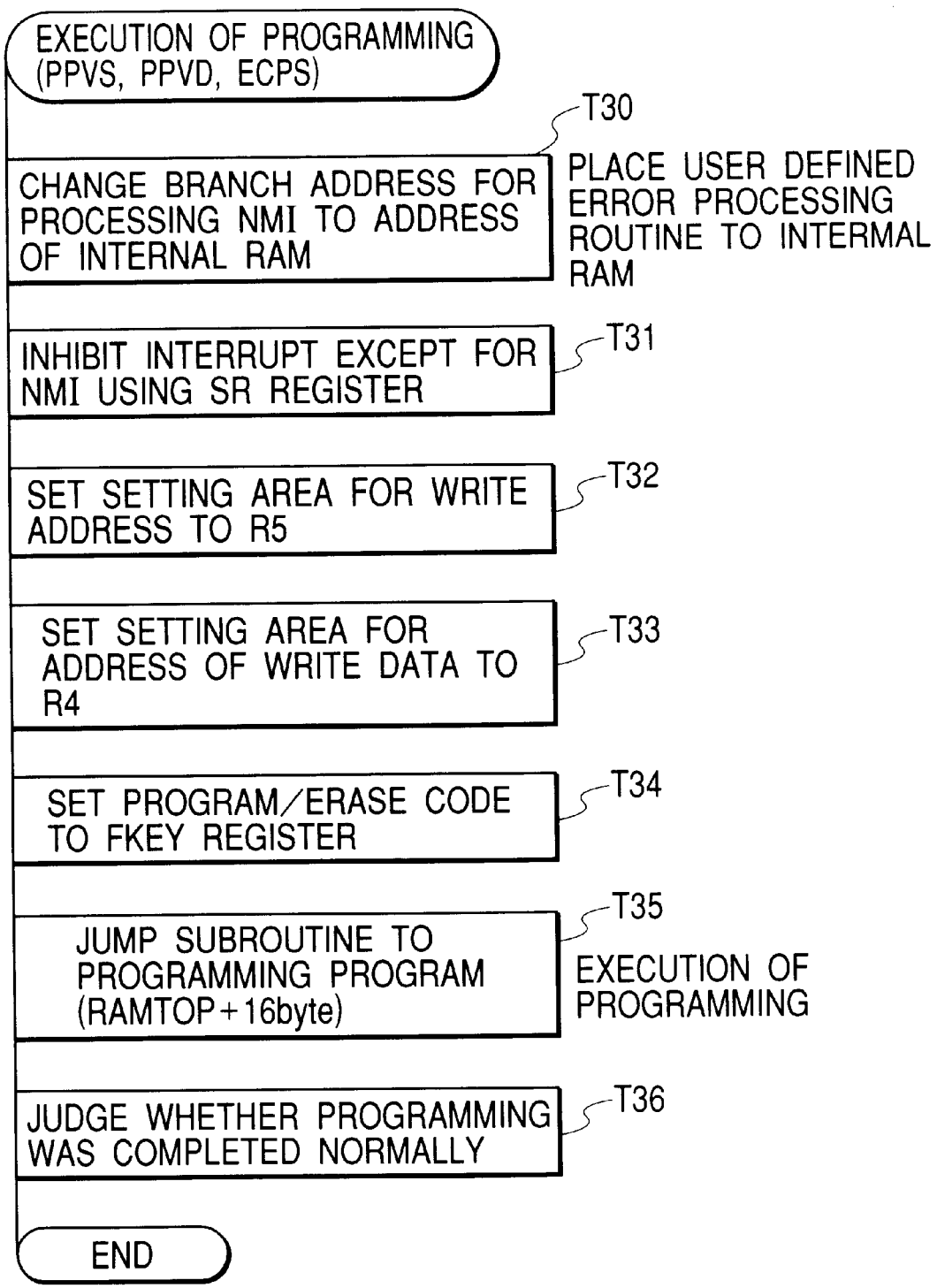
FIG. 17 is a flow chart showing details of the programming process (T3).

FIG. 17 shows an example of the programming process (T3). The branch address when a non-maskable interrupt (NMI) is received, is changed to the RAM 3 address area (T30). A vector base register may for example be set in the address area of the RAM 3. This is preferable in order to prevent operating errors by avoiding the flash memory area currently being written on. An NMI of this type may be utilized for calling up a user-defined error processing routine. And interrupts having an interrupt priority level lower than the NMI, may be masked out (T31). For example, an interrupt with a priority level one step lower than the NMI of the interrupt mask data IMSK may be set in the status register SR. This is effective when a high (level) voltage has been applied according to the flash memory status during erase/program. In this state, reading of the flash memory vector cannot be guaranteed, even if an interrupt such as IRQ arrives. Therefore, all interrupts other than NMI are prohibited during program/erase.

The setting area of the program address is set in the general-purpose register R5 (T32). In other words, the lead (beginning address) of the program address area written internally in the RAM 3 is set in the general-purpose register R5. The setting area of the program data address is then set in the general-purpose register R4 (T33). In other words, the lead (beginning address) of the program address area written internally in the RAM 3 is set in the general-purpose register R4. The program/erase code "5A" is then set (T34) in the FKEY register, and a jump made to the programming program (T35). Finally, a check is made that the programming ended correctly (T36).

Figure 19:
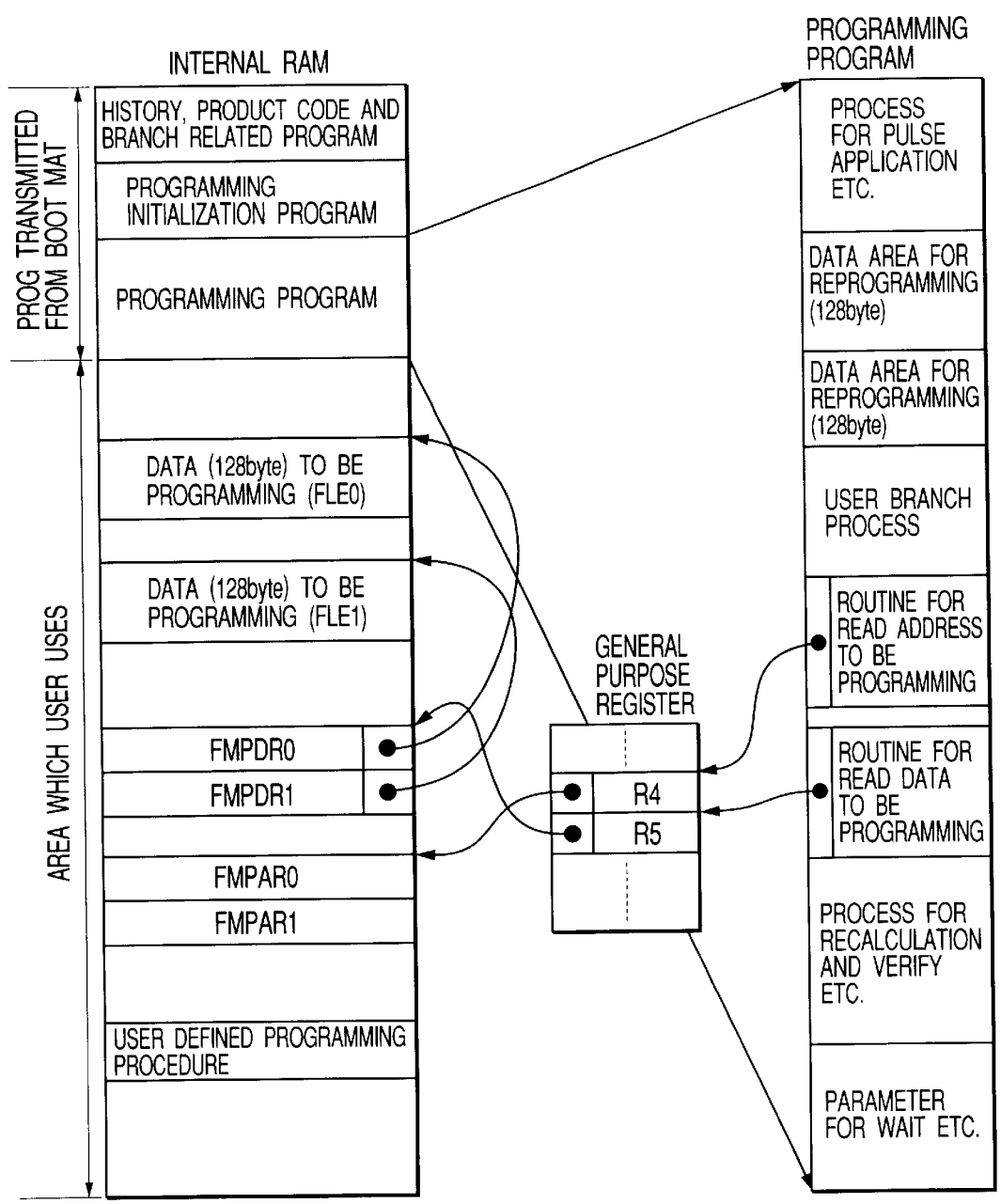
FIG. 19 is a drawing showing an example of data connections between the RAM 3, general-purpose registers (R4, R5) and programming program during programming.

FIG. 19 shows an example of data connections between the RAM 3, general-purpose registers (R4, R5) and programming program during the programming. Dual bank programming is assumed here, so the beginning address of the program address area and the beginning address of the program data address area must be able to refer to each bank and therefore the RAM areas FMPDR0, FMPDR1 can refer to the register R4, and the RAM areas FMPAR0, FMPAR1 can refer to the register R5.

Figure 20:
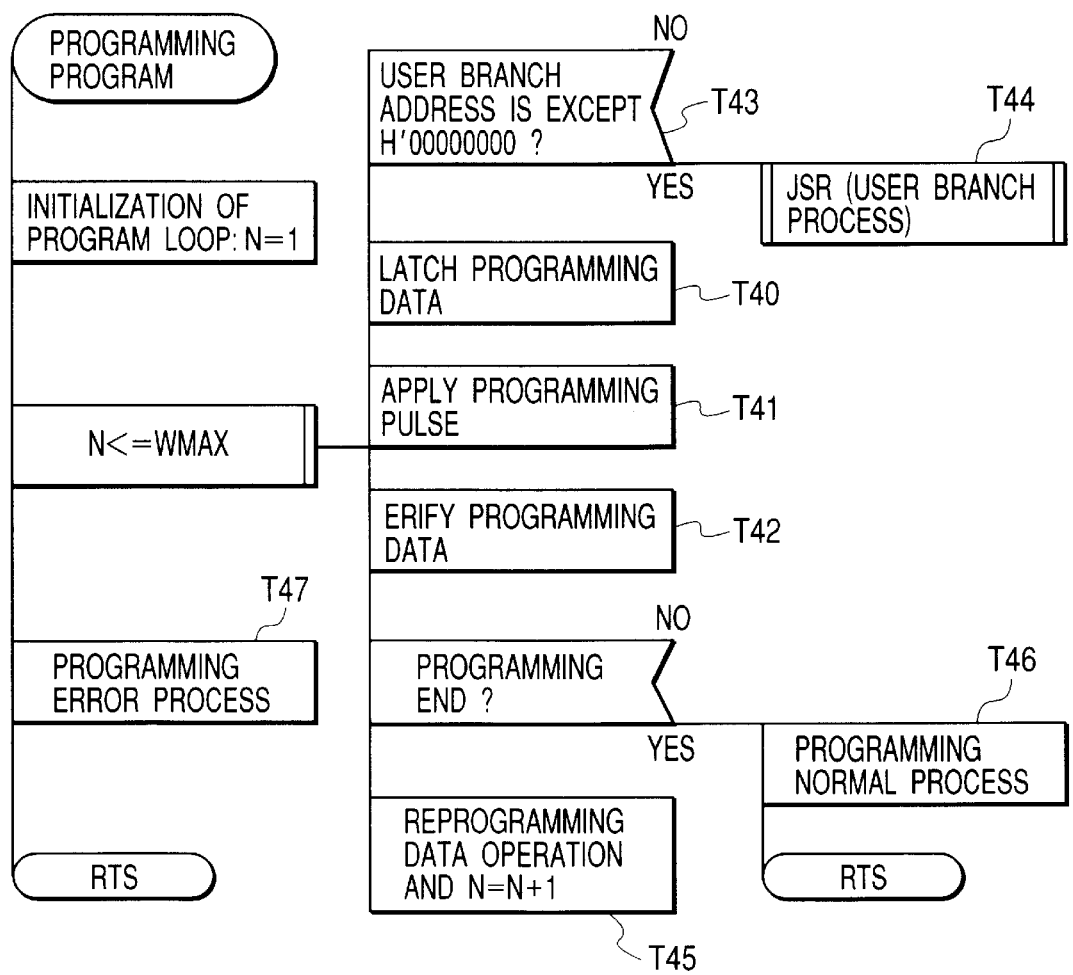
FIG. 20 is a flow chart showing the programming program processing of step T35 of FIG. 17.

FIG. 20 is a flow chart showing an example of programming program processing for step T35 of FIG. 17. This processing includes a step (T43) to determine whether to make a subroutine jump to the user branch address, during the program data latch (T40), program pulse application (T41) and program-verify (T42) processing cycle; and when a subroutine jump has been specified (when user branch address is other than H'00000000), the subroutine is executed (T44) branching out to the user branch addresses, according to the value set during initialization. After executing the subroutine, operation again returns to the programming routine. When the specified threshold cannot be obtained in programming-verify, the pulse application count N is incremented and the same loop is again repeated (T45). If the correct program status can be obtained at a point before the repeating count reaches the maximum count figure (WMAX), then the process flow returns to FIG. 17 (T46). If program status does not terminate correctly even after reaching the maximum count figure, then the programming error process (T47) is set, and operation returns to the process flow of FIG. 17.

If the subroutine processing shown by the user branch address can be distributed (branched out) in this way during the programming pulse application and programming-verify cycle, then control can be returned at fixed intervals in the user control program, even during programming. Furthermore, this is implemented by software so that the intervals where the process returns to user control can be changed by using the software. By being able to return to the user control program at fixed intervals, even during programming, the system using this microcomputer 1 does not have to be stopped for long periods of time, and erasing and programming can be performed. Therefore, unlike systems requiring verification of internal and external circumstances at every fixed time period or systems having a learning function, erasing and programming can be performed during ongoing execution of the user program.

Figure 21:
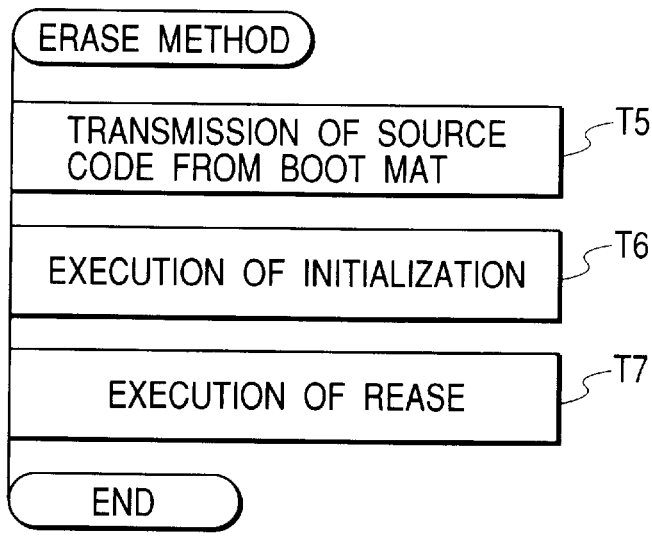
FIG. 21 is a concept flow chart of the erase processing of FIG. 13.

FIG. 21 is a concept flow chart of the erase processing of FIG. 13. The erase process is broadly grouped into; transferring the source code (erase and programming program, etc.) from the boot mat to the RAM 3 (T5), executing erase initialization (T6), and erasing (T7).

The transfer process (T5) is the same as the transfer process (T1). In the (erase) initializing (T6), an initialization program is executed for setting the user branch and setting the wait time loop count (dependent on operating frequency) on the program that was transferred.

In the erasing (T7), erasing is performed by jumping to a subroutine in the predetermined address of the erase program transferred to the RAM 3.

Figure 22:
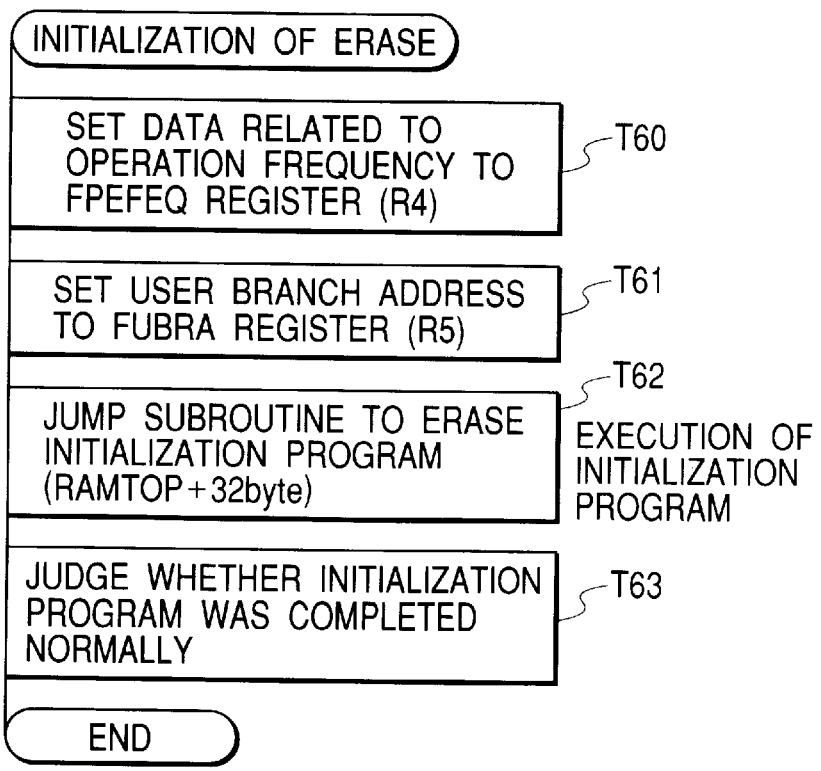
FIG. 22 is a flow chart shows the erase initializing (T6) steps.

FIG. 22 is a flow chart showing the erase initializing (T6) steps. First of all, the microcomputer 1 operating frequency is set (T60) in the FPEFEQ register (R4), and the user branch address is set in the FUBRA register (T61). The general-purpose register R5 of CPU 2 is assigned to the FUBRA register. The erase initialization program is then executed (T62). The wait loop count of the erase program is set to the initialization setting when transferred. An initialization program is then used, and all wait loop counts of the erase program are changed. To perform this calculation, the user sets the FPEFEQ (R4). User branch settings of the erase program are executed in the FUBRA register (R5). The erase initialization program refers to the settings in the FUBRA register, and executes the user branch or if already executed, changes the erase program for what address to jump to. To make this change, the user sets a value in the FUBRA register. Finally, a check is made to find if the initialization process ended correctly (T63), and the process ends.

The FUBRA register here signifies the same as in the programming process. An H'00000000 is set in this register when the user branch is not to be executed.

Figure 24:
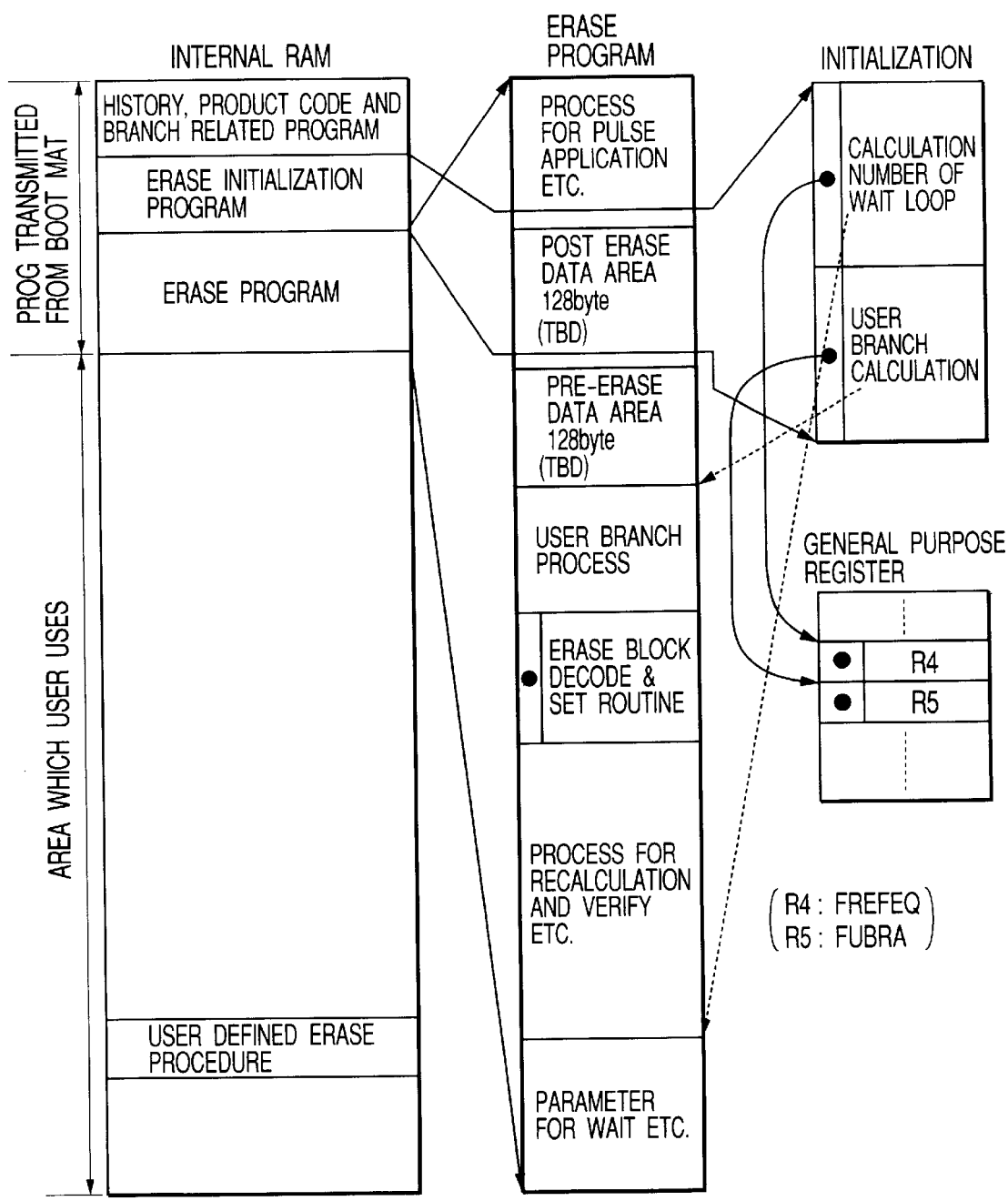
FIG. 24 is a drawing showing the data connection relation between the RAM 3, erase program, initialization program, and general-purpose registers (R4, R5) during the erase initializing of FIG. 22.

FIG. 24 shows an example of the data connection relation between the RAM 3, erase program, initialization program, and general-purpose registers (R4, R5) during the erase initializing of FIG. 22. In this figure, the initialization program searches the registers R4, R5, and reflects the search results in the user branch processing of the programming program. Clearly, the wait parameters are also reflected here.

Figure 23:
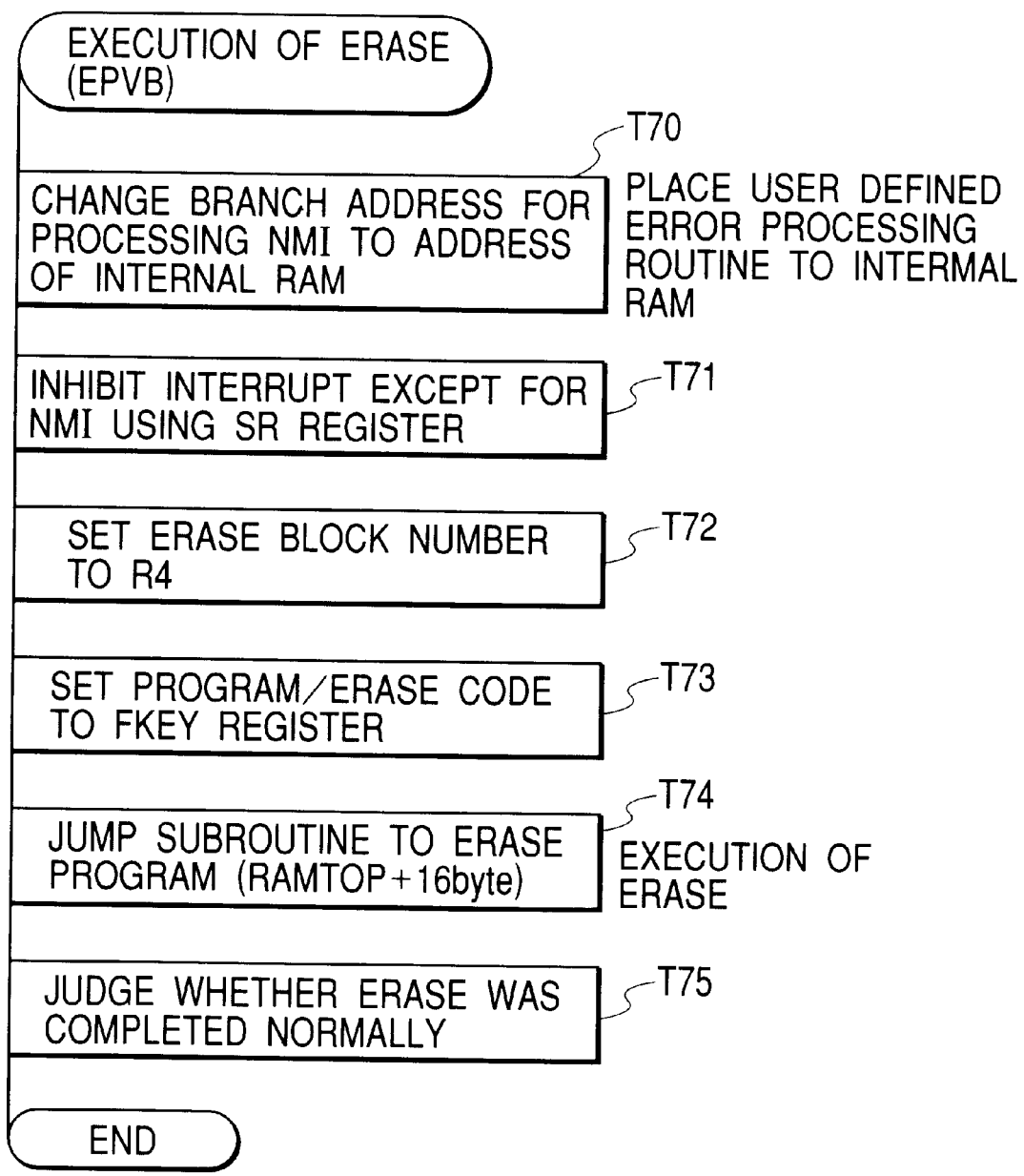
FIG. 23 is a flow chart shows the erasing (T7) steps.

FIG. 23 shows an example of the erasing (T7). First of all, the branch address when a non-maskable interrupt (NMI) is received, is changed to the RAM 3 address area (T70). A vector base register may for example be set in the address area of the RAM 3. This is preferable in order to prevent operating errors by avoiding the flash memory area currently being erased. An NMI of this type may be utilized for calling up a user-defined error processing routine. Also, interrupts having an interrupt priority level lower than the NMI, may be masked out (T71). For example, an interrupt with a priority level one step lower than the NMI of the interrupt mask data IMSK may be set in the status register SR. This is effective when a high (level) voltage has been applied according to the flash memory status during erase. In this state, reading of the flash memory vector cannot be guaranteed, even if an interrupt such as IRQ arrives. Therefore, all interrupts other than NMI are prohibited during erase.

The erase block No. is then set in the general-purpose register R4 (T72). The programming/erase code "5A" is then set (T34) in the FKEY register, and a jump made to the erase program (T74). Finally, a check is made that the erase ended correctly (T75).

Figure 25:
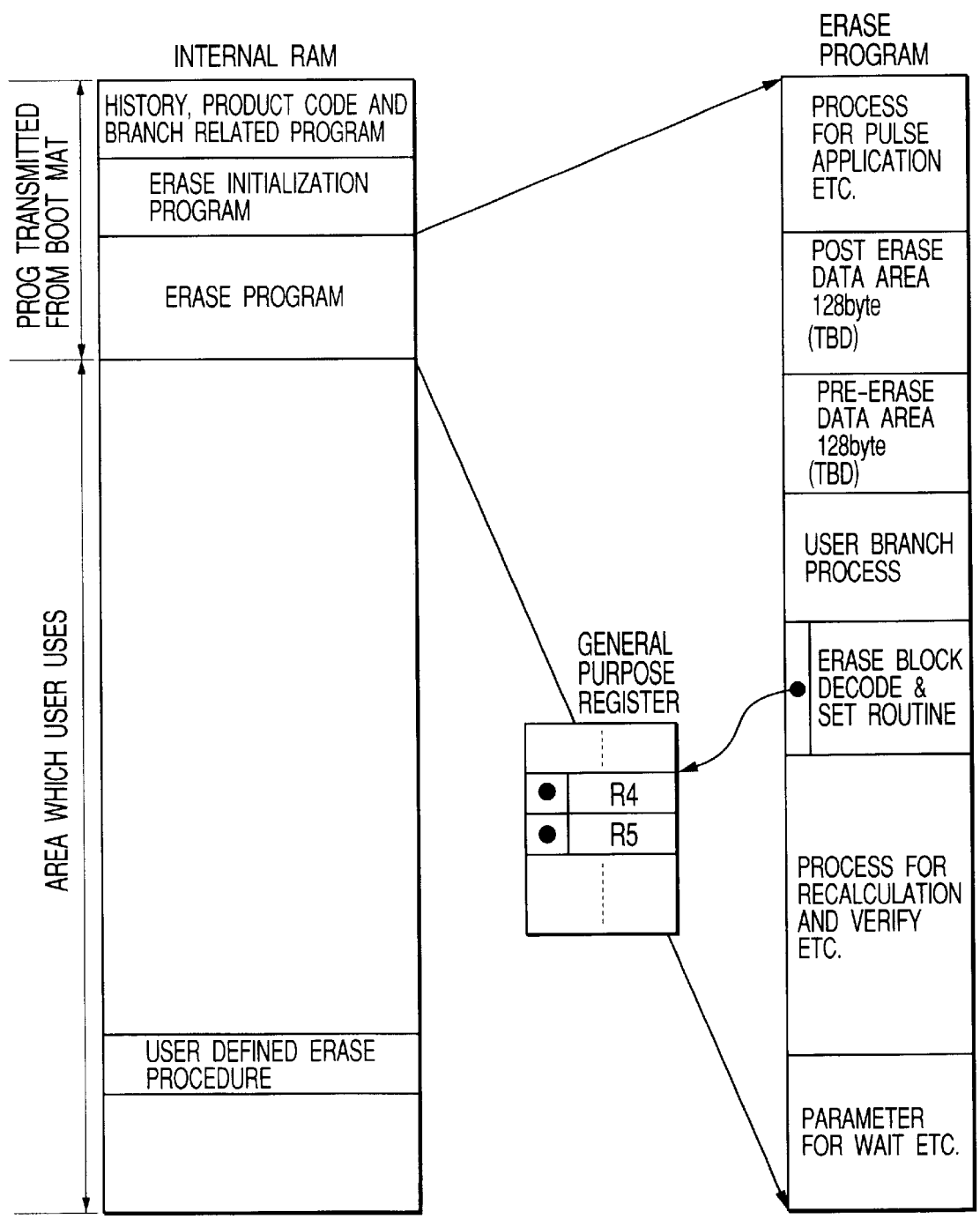
FIG. 25 is a drawing showing the data connection relation between the RAM, the general-purpose registers (R4, R5) and erase program during the erasing of FIG. 25.

FIG. 25 shows an example of the data connection relation between the RAM 3, general-purpose registers (R4, R5) and erase program during the erasing of FIG. 25. The user does not create an erase program in the connections shown here, so a selected erase block No. is exchanged by way of the FEBS register (R4) as an interface method for selecting the erase mat.

Figure 26:
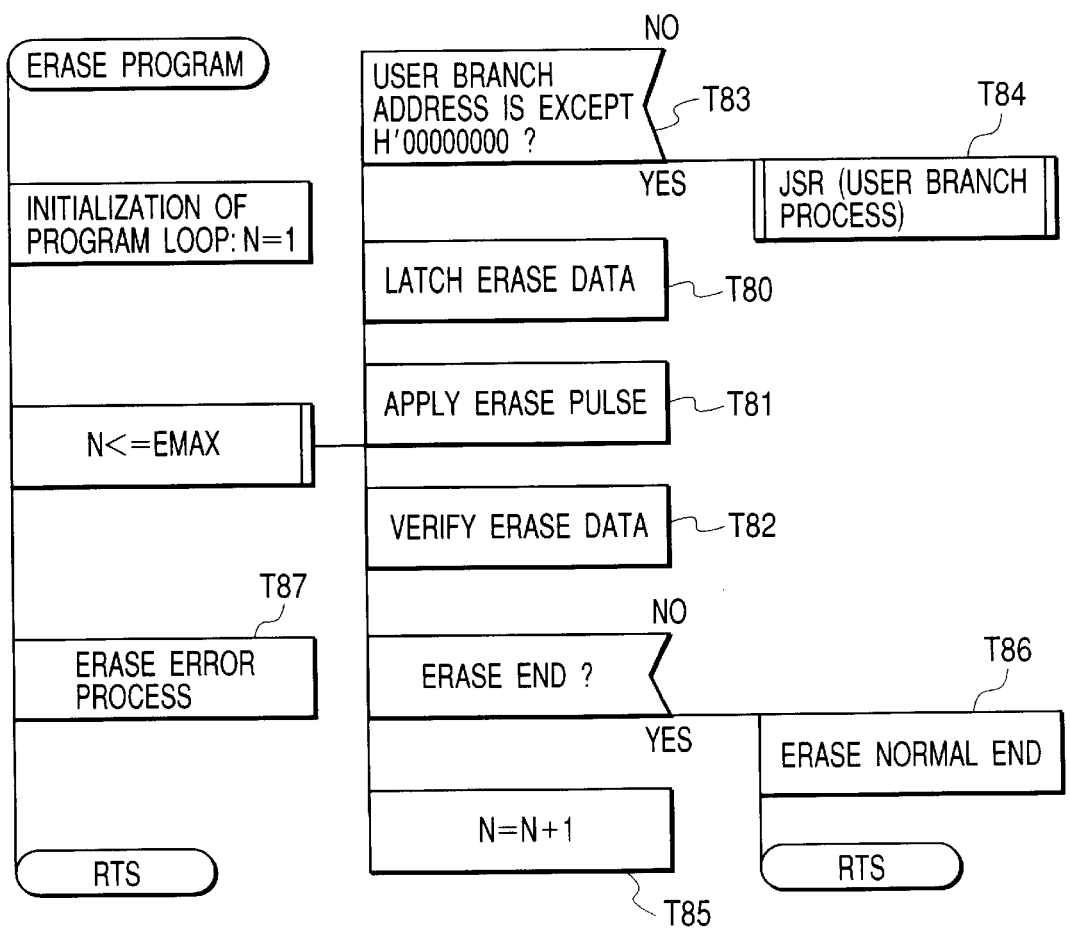
FIG. 26 is a drawing showing the process flow in the erase program corresponding to step T74 of FIG. 23.

FIG. 26 shows the process flow in the erase program corresponding to step T74 of FIG. 23. This process flow includes a step (T83) to determine whether to jump to a subroutine in the user branch address, during the erase data latch (T80), erase pulse application (T81), and erase-verify (T82) processing cycle; and when a subroutine jump has been specified (when the user branch address is other than H'00000000), the subroutine is executed (T84) branching out to the user branch addresses, according to the settings during initialization. After executing the subroutine, the operation again returns to the erase routine. When the specified threshold cannot be obtained in erase-verify, the pulse application count N is incremented and the same loop is again repeated (T85) If the correct erase status can be obtained at a point before the repeating count reaches the maximum count figure (EMAX), then the process flow returns to FIG. 23 (T86). If erase status does not terminate correctly even after the maximum count figure is reached, then the erase error process (T87) is set and operation returns to the process flow of FIG. 23.

If the subroutine processing indicated by the user branch address can be distributed (branched out) in this way during the erase pulse application and erase-verify cycle, then control can be returned at fixed intervals during the user control program, even during erase. By being able to return to the user control program at fixed intervals, even during erase, the system that uses this microcomputer 1 does not have to be stopped for long periods of time, and erasing can be implemented. Therefore, unlike systems requiring verification of internal and external circumstances at every fixed time period or systems having a learning function, erasing and programming can be performed during ongoing execution of the user program.

Program Running Out of Control at User Branch Address

Figure 27:
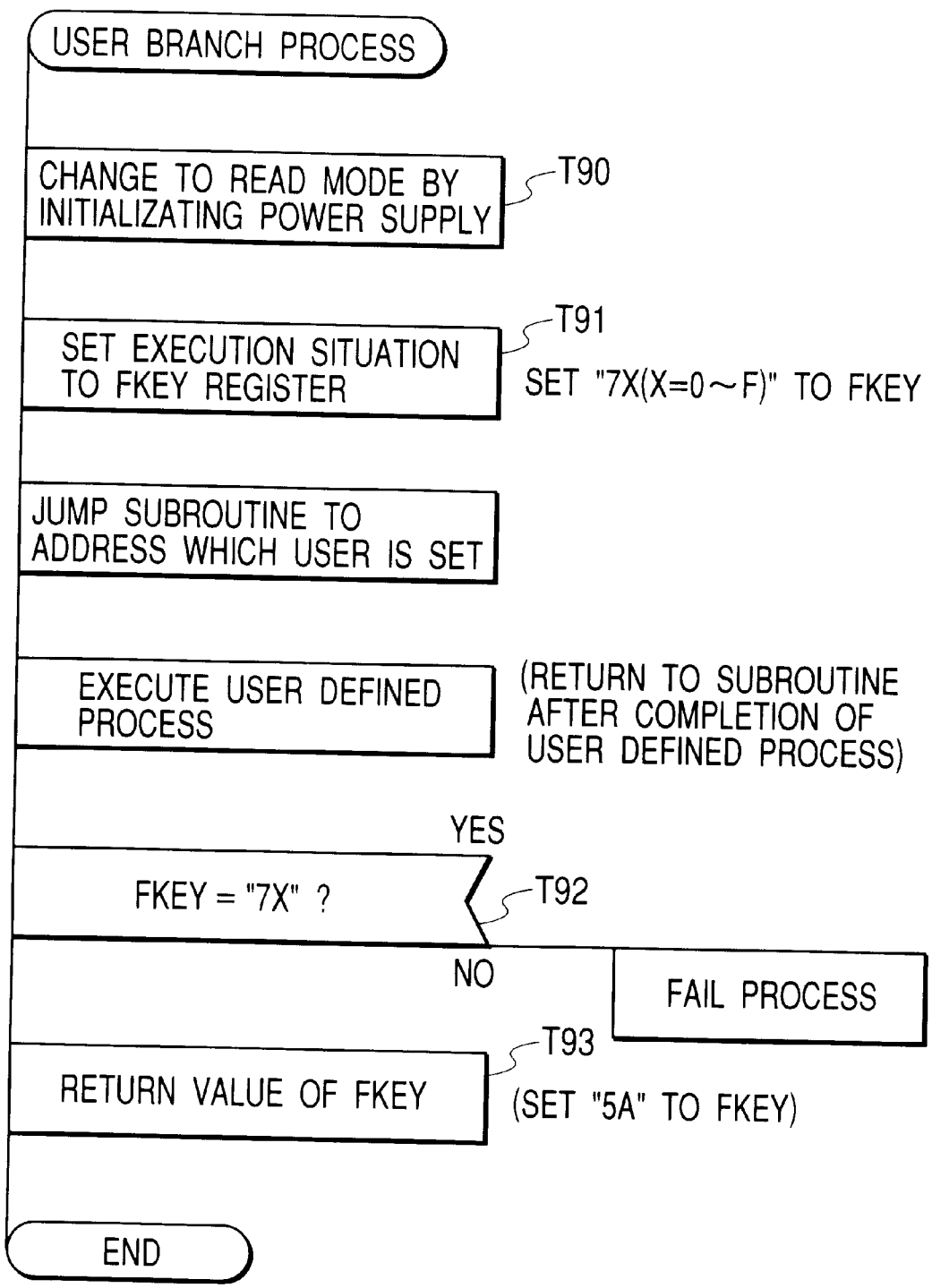
FIG. 27 is a flow chart of user branch processing for preventing destruction of information stored in the flash memory when the CPU runs out of control at the user branch address.

When the erase and programming program is being transferred and the Pfwe terminal is enabled ("1"), it is quite difficult to completely ensure that the information stored in the flash memory 13 will be completely maintained in a correct (undamaged) state under all circumstances. FIG. 27 shows user programming/erase processing methods for preventing destruction of information stored in the flash memory 13 when the CPU 2 runs out of control at the user branch address. Namely, in the user branch process of steps T44, T84 implemented after each processing step during the programming/erase process flow, the programming/erase power source is initialized and a shift made to read operation (T90) The value on the F5 key is then changed to any optional value, for example, 7X (X=0 to F) other than "5A" (T91). By implementing this value, the control bit SWE setting is disabled so that programming/erase can be easily rendered impossible, even if the CPU runs out of control at the user branch address.

In the processing in step T91, if the code on the FKEY register is set to some code signifying processing such as a code showing erase/programming progress status, then, in a case when a return is made in a programming/erase incomplete state from the programming/erase processing routine, or a case where the FKEY register value has changed from the expectation value, errors can be detected by referring to the FKEY register value. In the example in FIG. 27, the period between pulse application and verify is made "71", the verify and program data recalculation period is made "72", and the dummy programming period before recalculation and programming pulse is made "73", and upon exiting from the user branch processing, a check (T92) is made to find if the FKEY register value is "7X (X=1 to F)". Any value other than this is treated as an error, and fail processing of the erase/programming is performed (T93). However, if the FKEY is "7X" then the processing is determined to have ended correctly, and the FKEY is returned to "5A" (T93).

The register to hold the progress status need not be the FKEY however, in view of the fact that, in case of a user branch, programming to any value other than "5A" is a good measure to employ, utilizing the FKEY register is economical both in terms of hardware resources and the processing load.

The embodiments of the invention were described by specific examples however the present invention is not to be construed as being limited in any way by these examples and needless to say, adaptations and changes of different types can be achieved without departing from the spirit and scope of the present invention.

For example, the nonvolatile memory capable of being erase and written is not limited to a flash memory having a binary value. The flash memory may for example be a multivalue flash memory capable of holding 2 or more bits of storage information in one flash memory cell. In other words, a memory wherein, for storage of information, one flash memory cell is set with one threshold voltage from among threshold voltages of four or more types specified by multiple bit program data, and when reading out information, multiple bit information corresponding to the threshold voltage status is output, so that the information stored in one flash memory cell is expressed as multiple bits. In the example of a flash memory related here, two bits of information can be written in one flash memory cell, and that information can be output. In a multivalue storage technology for achieving a flash memory of this type, the information storage state of one memory cell is one state selected for example from among an erase state ("11"), a first program state ("10"), a second program state ("00"), and a third program state ("01"). The total of four information storage states are determined by two-bit data. In other words, two bits of data are stored in one memory cell.

Further, the flash memory cell is not limited to a vertical laminated structure of floating gates and control gates, and may employ a device structure using for example, having a control gate utilizing the channel area by way of a MOS gate capacitor formed from gate electrodes consisting of floating gate electrodes made of MOS transistor gate electrodes. Also, the nonvolatile storage element is not limited to a flash memory, and may be a nonvolatile memory such as an EEPROM (Electrical Erasable And Programmable Read Only Memory) of storage elements consisting of MNOS (Metal Nitride Oxide Semiconductor) transistors, or may be a ferroelectric memory, etc.

The circuit module contained on-chip by the microcomputer is not limited to the example of the invention, and may be changed to a suitable type.

The erase and programming program is not limited to a structure held in the boot mat, and for example, a structure to download the program from the system board may be employed. The register means may be a peripheral register incorporated within the flash memory, or may be a general-purpose memory incorporated into the CPU, or may be a memory-mapped I/O register structured on a memory such as a SRAM.

The user branch was described as an object to execute the program after performing programming-initializing beforehand, of the jump address code for the jump subroutine, based on the value set in the FUBRA register (R5). However, instead of that method, directly searching the FUBRA register (R5) with this jump subroutine command and then branching, may be employed. In that case, the compiler for the erase and programming program, can only search general-purpose registers R5 within a range of general-purpose registers whose number is limited to a variable within one function.

Effects rendered by the typical invention as disclosed in these specifications are briefly described as follows.

In other words, a serial interface does not always have to be created on the user mounted board, and onboard programming can be implemented with a dedicated user communication protocol, so that the dedicated user communication protocol code will not be damaged even if the (CPU) runs out of control.

The user control program can be created on the user mat, and the program is easy to make. In other words, a user optional program interface for programming and erasing can be implemented by separating the user boot mat and the user mat so that a control program for storage and use in the user mat can easily be made, even without programming a dedicated communication protocol program in the user mat. In other words, special measures for preventing erasure of the communications control program used in the user program mode are not needed.

Erasing and programming of the user boot mat by the hardware is impossible in the user boot mode started up from the user boot mat, so information stored in the user boot mat will not be destroyed even if the system runs out of control, and even if the CPU runs out of control during debugging, the damage will not extend to the program controlling the external interface so that the user mat can be freely programmed onboard, and without having to remove the microcomputer chip that was installed.

What is claimed is:

1. A microcomputer comprising:
    a CPU;
    an electrically erasable and programmable nonvolatile memory having a first area, a second area, and a third area; and
    an operating mode specifier which specifies:
        a first mode for processing a program of the first area by the CPU and disabling programming and erasing in the first area;
        a second mode for processing a program of the second area by the CPU and disabling programming and erasing in the first area and the second area; and
        a third mode for processing a program of the third area by the CPU and disabling programming and erasing in the first area and the second area.

2. A microcomputer according to claim 1, wherein said operating mode specifier is a signal input circuit.

3. A microcomputer comprising:
    a CPU;
    an electrically erasable and programmable nonvolatile memory having a first area, a second area and a third area; and
    an operating mode specifier which selectively specifies a first mode, a second mode and a third mode;

wherein said CPU processes a program of said first area if said first mode is specified, processes a program of said second area if said second mode is specified, and processes a program of said third area if said third mode is specified; and wherein said first mode enables programming and erasing in said second area and said third area and disables programming and erasing in said first area, said second mode enables programming and erasing in said third area and disables programming and erasing in said first area and said second area, and said third mode enables programming and erasing in said third area and disables programming and erasing in said first area and said second area.

4. A microcomputer according to claim 1, wherein said first area contains a first communication control program for establishing an external interface with the microcomputer.

5. A microcomputer according to claim 1,
wherein said first area includes a first communication control program for establishing an external interface with the microcomputer, and
wherein said second area includes a second communication control program for establishing an external interface with the microcomputer.

6. A microcomputer according to claim 4, wherein said first area includes an erasing and programming program for programming and erasing of said nonvolatile memory.

7. A microcomputer according to claim 6, wherein said first area includes a transfer control program for said erasing and programming program.

8. A microcomputer according to claim 7, further including a RAM where said erasing and programming program is transferred by the CPU executing said transfer control program.

9. A microcomputer according to claim 3, wherein a condition to enable programming and erasing is a command specifying programming operation applied from an external terminal.

10. A microcomputer according to claim 3,
wherein each of the beginning addresses for said first area, said second area and said third area are identical addresses on a CPU address space, and
wherein a first register portion, to exclusively specify the second area or the third area as the lead address utilized by the CPU, is assigned in the CPU address space.

11. A microcomputer according to claim 10, wherein a RAM is assigned in said CPU address space.

12. A microcomputer according to claim 11, further comprising:
a bus controller to change a setting of said first register portion as a condition for the CPU to process programs in the RAM.

13. A microcomputer according to claim 11, further including:
a second register portion having information allowing storing of the erasing and programming program in the RAM, and
wherein resetting the information in the second register is a necessary condition for enabling erasing and programming of the nonvolatile memory.

14. A microcomputer according to claim 3, further including:
a RAM assigned in an address space of said CPU,
wherein said first area includes an erasing and programming program, and
wherein said CPU transfers said erasing and programming program to said RAM in response to said first mode and fetches said erasing and programming program from the RAM as a transfer destination.

15. A microcomputer according to claim 14, wherein in said second mode, said CPU shifts to processing the program of said first area in response to a first setting value of a third register portion, and transfers said erasing and programming program to said RAM, and restores the status of processing a program in said second area.

16. A microcomputer according to claim 15, wherein in said third mode, said CPU shifts to processing the program of said first area in response to the first setting value of said third register portion, and transfers said erasing and programming program to said RAM, and restores the status of processing a program in said third area.

17. A microcomputer according to claim 15, further including:
a second register portion having a second setting value to grant permission to store said erasing and programming program in said RAM;
wherein in said nonvolatile memory, the resetting of the second register by a third setting value is a necessary condition for allowing erasing and programming operation; and
wherein a status where said second setting value is set in said second register portion is a necessary condition for setting the first setting value in said third register portion.

18. A microcomputer comprising:
a CPU;
a RAM; and
an electrically erasable and programmable nonvolatile memory subject to being erased and programmed, said nonvolatile memory including a first memory mat and a second memory mat, the first memory mat and second memory mat being exclusively selectable; and
wherein erasing and programming in said first memory mat are disabled when the first memory mat is selected; and
wherein when the second memory mat is selected, erasing and programming in the second memory mat are disabled under a condition that a program execution state of the CPU is transferred to an execution of the program on the RAM.

19. A microcomputer comprising:
a CPU; and
an electrically erasable and programmable nonvolatile memory subject to being erased and programmed, wherein said nonvolatile memory includes:
a first area for storing a communication program processed by the CPU to establish an external interface;
a second area subject to being electrically erased and programmed with an external interface established by the communication program of the first area processed by said CPU, and
a third area subject to being electrically erased and programmed with an external interface established by the communication program of the first area processed by said CPU and further subject to being electrically erased and programmed by a communication program of the second area processed by said CPU.

20. A microcomputer mounted on a board having a first interface, comprising:
a central processing unit; and
an electrically erasable and programmable nonvolatile memory including:
a first memory storage area for storing a first communication program for establishing a communication protocol using a second interface different from said first interface;

a second memory storage area for storing a second communication program for establishing a communication protocol using said first interface; and a third memory storage area for storing a control program executed by said central processing unit in a specified first operating mode.

21. A microcomputer according to claim 20, wherein said first memory storage area further stores a programming program, and wherein said second communication program is written into said second memory storage area by said central processing unit implementing a first programming mode by executing said programming program and said first communication program.

22. A microcomputer according to claim 21, wherein said control program is written onto said third memory storage area by either said first programming mode, or said second programming mode implemented by said central processing unit executing a programming program stored in said first storage area and said second communication program.

23. A microcomputer according to claim 20, wherein said first interface is an ATAPI interface, an SCSI interface or a CAN interface.

24. A microcomputer according to claim 20, wherein said second interface is a serial interface utilizing start-stop synchronization.

25. A microcomputer according to claim 20, wherein said nonvolatile memory includes a plurality of nonvolatile memory cells having floating gates.

26. A microcomputer according to claim 25, wherein said nonvolatile memory is a flash memory.

27. A microcomputer according to claim 20, wherein said first memory storage area also stores an erase program, and wherein said second communication program is erasable from said second memory storage area by a first erase mode implemented by said central processing unit executing said erase program and said first communication program.

28. A microcomputer according to claim 27, wherein said control program is erased from said third memory storage area by either a first erase mode, or a second erase mode implemented by said central processing unit executing said erase program stored in said first memory storage area and said second communication program.

29. A microcomputer according to claim 28, wherein said first memory storage area also stores a programming program, and wherein a said second communication program is written into said second memory storage area by a first programming mode implemented by a central processing unit executing said programming program and said first communication program.

30. A microcomputer according to claim 29, wherein said control program is programmed into said third memory storage area by either a first programming mode, or a second programming mode implemented by said central processing unit executing said second communication program and the programming program stored in said first memory storage area.

31. A microcomputer comprising:

a central processing unit; and a nonvolatile memory including:

a first memory storage area for storing a programming program and a first communication program to establish a communication protocol using a first interface, a second memory storage area for storing a second communication program for establishing a communication protocol using a second interface different from said first interface, and a third memory storage area for storing a control program executed by said central processing unit in a specified first operating mode.

32. A microcomputer according to claim 31, wherein said second communication program is written in said second memory storage area by a first programming mode implemented by said central processing unit executing said first communication program and said programming program.

33. A microcomputer according to claim 32, wherein said control program is written in said third memory storage area by either a first programming mode, or a second programming mode implemented by said central processing unit executing said second communication program and the programming program stored in said first memory storage area.

34. A microcomputer according to claim 31, wherein said first memory storage area further stores an erase program, and wherein said second communication program stored in said second memory storage area, is erased from said second memory storage area, by implementing said first erase mode by said central processing unit executing said first communication program and said erase program.

35. A microcomputer according to claim 34, wherein said control program is erased from said third memory storage area by either a first erase mode, or by a second erase mode implemented by said central processing unit executing said second communications program and said erase program stored in said first memory storage area.

36. A microcomputer according to claim 31, wherein said first interface is at least one interface selected from among an ATAPI interface, an SCSI interface, and a CAN interface.

37. A microcomputer according to claim 31, wherein said second interface is a serial interface utilizing start-stop synchronization.

38. A microcomputer according to claim 31, wherein said nonvolatile memory includes a plurality of nonvolatile memory cells having floating gates.

39. A microcomputer according to claim 31, wherein said nonvolatile memory is a flash memory.

* * * * *